US008645372B2

(12) United States Patent
Diamond et al.

(10) Patent No.: US 8,645,372 B2
(45) Date of Patent: Feb. 4, 2014

(54) KEYWORD-BASED SEARCH ENGINE RESULTS USING ENHANCED QUERY STRATEGIES

(75) Inventors: Ted Diamond, Seattle, WA (US);
Jisheng Liang, Bellevue, WA (US);
Jonathan Reichhold, Seattle, WA (US);
Krzysztof Koperski, Seattle, WA (US)

(73) Assignee: Evri, Inc., Seattle, WA (US)

( * ) Notice: Subject to any disclaimer, the term of this patent is extended or adjusted under 35 U.S.C. 154(b) by 1 day.

(21) Appl. No.: 12/915,213

(22) Filed: Oct. 29, 2010

(65) Prior Publication Data
US 2011/0119243 A1     May 19, 2011

Related U.S. Application Data

(60) Provisional application No. 61/256,851, filed on Oct. 30, 2009.

(51) Int. Cl.
*G06F 7/00*     (2006.01)
(52) U.S. Cl.
USPC ........................................... 707/733; 707/767
(58) Field of Classification Search
USPC .................. 707/733–734, 784, 777, 999.005, 707/765–767; 705/319
See application file for complete search history.

(56) References Cited

U.S. PATENT DOCUMENTS

| 4,839,853 | A | 6/1989 | Deerwester et al. | 364/900 |
|---|---|---|---|---|
| 5,301,109 | A | 4/1994 | Landauer et al. | 364/419.19 |
| 5,317,507 | A | 5/1994 | Gallant | 364/419.13 |
| 5,325,298 | A | 6/1994 | Gallant | 364/419.19 |
| 5,331,556 | A | 7/1994 | Black, Jr. et al. | 364/419.08 |
| 5,377,103 | A | 12/1994 | Lamberti et al. | 364/419.08 |
| 5,619,709 | A | 4/1997 | Caid et al. | 395/794 |

(Continued)

FOREIGN PATENT DOCUMENTS

| EP | 0 280 866 | 9/1988 |
|---|---|---|
| EP | 0 597 630 | 7/2002 |

(Continued)

OTHER PUBLICATIONS

Abraham, "FoXQ—Xquery by Forms," Human Centric Computing Languages and Environments, Proceedings 2003 IEEE Symposium, Oct. 28-31, 2003, Piscataway, New Jersey, pp. 289-290.

(Continued)

*Primary Examiner* — James Trujillo
*Assistant Examiner* — Linh Black
(74) *Attorney, Agent, or Firm* — Lowe Graham Jones PLLC

(57) ABSTRACT

Enhanced computer- and network-based methods, systems, techniques are provided for retrieving more accurate and responsive search results when searching content for a designated entity using an off-the-shelf keyword-based search engine. For example, the embodiments described herein may be used to improve search results by eliminating off-topic results when presenting queries to an existing keyword-based search engine invoked by means of an API from an intermediating application. Example embodiments provide a Keyword-Based Search Enhancement System ("KBSES"), which enables intermediating applications to obtain information more closely related to user queries by enhancing such queries, on behalf of the user, with disambiguating information when deemed necessary. Based upon a variety of rules and heuristics, which can be modified as well, the KBSES determines whether an entity name in a user's query should be enhanced with additional disambiguating information, and to what extent, to prevent the retrieval of off-topic results.

26 Claims, 13 Drawing Sheets

(56) References Cited

U.S. PATENT DOCUMENTS

| | | | |
|---|---|---|---|
| 5,778,362 A | 7/1998 | Deerwester | 707/5 |
| 5,794,050 A | 8/1998 | Dahlgren et al. | 395/708 |
| 5,794,178 A | 8/1998 | Caid et al. | 704/9 |
| 5,799,268 A | 8/1998 | Boguraev | 704/9 |
| 5,848,417 A | 12/1998 | Shoji et al. | 707/102 |
| 5,857,179 A | 1/1999 | Vaithyanathan et al. | 707/2 |
| 5,884,302 A | 3/1999 | Ho | 707/3 |
| 5,933,822 A | 8/1999 | Braden-Harder et al. | 707/5 |
| 5,950,189 A | 9/1999 | Cohen et al. | 707/3 |
| 5,982,370 A | 11/1999 | Kamper | 345/356 |
| 6,006,221 A | 12/1999 | Liddy et al. | 707/5 |
| 6,006,225 A | 12/1999 | Bowman et al. | 705/5 |
| 6,026,388 A | 2/2000 | Liddy et al. | 707/1 |
| 6,061,675 A | 5/2000 | Wical | 706/45 |
| 6,064,951 A | 5/2000 | Park et al. | 704/8 |
| 6,122,647 A | 9/2000 | Horowitz et al. | 707/513 |
| 6,185,550 B1 | 2/2001 | Snow et al. | 707/1 |
| 6,192,360 B1 | 2/2001 | Dumais et al. | 707/6 |
| 6,202,064 B1 | 3/2001 | Julliard | 707/5 |
| 6,219,664 B1 | 4/2001 | Watanabe | 707/3 |
| 6,246,977 B1 | 6/2001 | Messerly et al. | 704/9 |
| 6,311,152 B1 | 10/2001 | Bai et al. | 704/9 |
| 6,363,373 B1 | 3/2002 | Steinkraus | 707/3 |
| 6,405,190 B1 | 6/2002 | Conklin | 707/3 |
| 6,411,962 B1 | 6/2002 | Kupiec | |
| 6,460,029 B1 | 10/2002 | Fries et al. | |
| 6,510,406 B1 | 1/2003 | Marchisio | |
| 6,571,236 B1 | 5/2003 | Ruppelt | 707/3 |
| 6,584,464 B1 | 6/2003 | Warthen | |
| 6,601,026 B2 | 7/2003 | Appelt et al. | |
| 6,728,707 B1 | 4/2004 | Wakefield et al. | |
| 6,732,097 B1 | 5/2004 | Wakefield et al. | |
| 6,732,098 B1 | 5/2004 | Wakefield et al. | |
| 6,738,765 B1 | 5/2004 | Wakefield et al. | |
| 6,741,988 B1 | 5/2004 | Wakefield et al. | |
| 6,745,161 B1 | 6/2004 | Arnold et al. | 704/7 |
| 6,757,646 B2 | 6/2004 | Marchisio | 704/8 |
| 6,859,800 B1 | 2/2005 | Roche et al. | 707/3 |
| 6,862,710 B1 | 3/2005 | Marchisio | 715/501.1 |
| 6,910,003 B1 | 6/2005 | Arnold et al. | 704/4 |
| 6,996,575 B2 | 2/2006 | Cox et al. | 707/102 |
| 7,051,017 B2 | 5/2006 | Marchisio | 707/3 |
| 7,054,854 B1 | 5/2006 | Hattori et al. | 707/3 |
| 7,171,349 B1 | 1/2007 | Wakefield et al. | 704/9 |
| 7,283,951 B2 | 10/2007 | Marchisio et al. | 704/9 |
| 7,398,201 B2 | 7/2008 | Marchisio et al. | 704/9 |
| 7,403,938 B2 | 7/2008 | Harrison et al. | 707/3 |
| 7,526,425 B2 | 4/2009 | Marchisio et al. | 704/9 |
| 7,672,833 B2 | 3/2010 | Blume et al. | 704/10 |
| 8,122,026 B1 | 2/2012 | Laroco, Jr. et al. | 707/737 |
| 2002/0007267 A1 | 1/2002 | Batchilo et al. | 704/9 |
| 2002/0010574 A1 | 1/2002 | Tsourikov et al. | 704/9 |
| 2002/0059161 A1 | 5/2002 | Li | 707/1 |
| 2002/0078041 A1 | 6/2002 | Wu | 704/4 |
| 2002/0091671 A1 | 7/2002 | Prokoph | 707/1 |
| 2002/0103789 A1* | 8/2002 | Turnbull et al. | 707/3 |
| 2002/0156763 A1 | 10/2002 | Marchisio | 707/1 |
| 2003/0004716 A1 | 1/2003 | Haigh et al. | 704/238 |
| 2003/0101182 A1 | 5/2003 | Govrin et al. | 707/7 |
| 2003/0115065 A1 | 6/2003 | Kakivaya et al. | 704/270.1 |
| 2003/0115191 A1 | 6/2003 | Copperman et al. | 707/3 |
| 2003/0233224 A1 | 12/2003 | Marchisio et al. | 704/4 |
| 2004/0064447 A1 | 4/2004 | Simske et al. | 707/5 |
| 2004/0103090 A1 | 5/2004 | Dogl et al. | 707/3 |
| 2004/0125877 A1 | 7/2004 | Chang et al. | 375/240.28 |
| 2004/0167870 A1 | 8/2004 | Wakefield et al. | 707/1 |
| 2004/0167883 A1 | 8/2004 | Wakefield et al. | 707/3 |
| 2004/0167884 A1 | 8/2004 | Wakefield et al. | 707/3 |
| 2004/0167885 A1 | 8/2004 | Wakefield et al. | 707/3 |
| 2004/0167886 A1 | 8/2004 | Wakefield et al. | 707/3 |
| 2004/0167887 A1 | 8/2004 | Wakefield et al. | 707/3 |
| 2004/0167907 A1 | 8/2004 | Wakefield et al. | 707/100 |
| 2004/0167908 A1 | 8/2004 | Wakefield et al. | 707/100 |
| 2004/0167909 A1 | 8/2004 | Wakefield et al. | 707/100 |
| 2004/0167910 A1 | 8/2004 | Wakefield et al. | 707/100 |
| 2004/0167911 A1 | 8/2004 | Wakefield et al. | 707/100 |
| 2004/0221235 A1 | 11/2004 | Marchisio et al. | 715/534 |
| 2004/0243388 A1 | 12/2004 | Corman et al. | 704/1 |
| 2005/0027704 A1 | 2/2005 | Hammond et al. | 707/5 |
| 2005/0108001 A1 | 5/2005 | Aarskog | 704/10 |
| 2005/0138018 A1 | 6/2005 | Sakai et al. | 707/3 |
| 2005/0144064 A1 | 6/2005 | Calabria et al. | 705/14 |
| 2005/0149494 A1 | 7/2005 | Lindh et al. | 707/3 |
| 2005/0177805 A1 | 8/2005 | Lynch et al. | 715/968 |
| 2005/0197828 A1 | 9/2005 | McConnell et al. | 704/9 |
| 2005/0210000 A1 | 9/2005 | Michard | 707/3 |
| 2005/0216443 A1 | 9/2005 | Morton et al. | 707/3 |
| 2005/0267871 A1 | 12/2005 | Marchisio et al. | 707/3 |
| 2006/0149734 A1 | 7/2006 | Egnor et al. | 707/7 |
| 2007/0067285 A1 | 3/2007 | Blume et al. | 707/5 |
| 2008/0055651 A1 | 1/2008 | Grefenstette et al. | |
| 2008/0059456 A1 | 3/2008 | Chowdhury et al. | 707/5 |
| 2008/0082578 A1 | 4/2008 | Hogue et al. | 707/104.1 |
| 2008/0097975 A1* | 4/2008 | Guay et al. | 707/4 |
| 2008/0288456 A1 | 11/2008 | Omoigui | 707/3 |
| 2009/0228439 A1 | 9/2009 | Manolescu et al. | |
| 2010/0046842 A1* | 2/2010 | Conwell | 382/218 |
| 2010/0048242 A1* | 2/2010 | Rhoads et al. | 455/556.1 |
| 2010/0250497 A1* | 9/2010 | Redlich et al. | 707/661 |

FOREIGN PATENT DOCUMENTS

| | | |
|---|---|---|
| WO | WO 00/14651 | 3/2000 |
| WO | WO 00/57302 | 9/2000 |
| WO | WO 01/22280 | 3/2001 |
| WO | WO 01/80177 | 10/2001 |
| WO | WO 02/27536 | 4/2002 |
| WO | WO 02/33583 | 4/2002 |
| WO | WO 03/017143 | 2/2003 |
| WO | WO 2004/053645 | 6/2004 |
| WO | WO 2004/114163 | 12/2004 |
| WO | WO 2006/068872 | 6/2006 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Feldman et al., "Text Mining at the Term Level," *Proc. of the 2nd European Symposium on Principles of Data Mining and Knowledge Discover*, Nantes, France, 1998.

Ilyas et al., "A Conceptual Architecture for Semantic Search Engine," IEEE, INMIC, 2004, pp. 605-610.

Jayapandian et al., "Automating the Design and Construction of Query Forms," Data Engineering, Proceedings of the 22nd International Conference IEEE, Atlanta, Georgia, Apr. 3, 2006, pp. 125-127.

Kaiser, "Ginseng—A Natural Language User Interface for Semantic Web Search," University of Zurich, Sep. 16, 2004, URL=http://www.ifi.unizh.ch/archive/mastertheses/DA_Arbeiten_2004/Kaiser_Christian.pdf, pp. 1-84.

Liang et al., "Extracting Statistical Data Frames from Text," SIGKDD Explorations, Jun. 2005. vol. 7, No. 1, pp. 67-75.

Littman et al., "Automatic Cross-Language Information Retrieval using Latent Semantic Indexing," In Grefenstette, G., editor, Cross Language Information Retrieval. Kluwer, 1998.

Nagao et al., "Semantic Annotation and Transcoding: Making Web Content More Accessible," *IEEE Multimedia, IEEE Computer Society, US.* 8(2):69-81, Apr. 2001.

Nguyen et al., "Accessing Relational Databases from the World Wide Web," SIGMOD Record. ACM USA, Jun. 1996, vol. 25, No. 2, pp. 529-540.

Pohlmann et al., "The Effect of Syntactic Phrase Indexing on Retrieval Performance for Dutch Texts," Proceedings of RIAO, pp. 176-187, Jun. 1997.

Rasmussen, "WDB-A Web Interface to Sybase," Astronomical Society of the Pacific Conference Series, Astron. Soc. Pacific USA, 1995, vol. 77, pp. 72-75.

Sneiders, "Automated Question Answering Using Question Templates That Cover the Conceptual Model of the Database," Natural Language Processing and Information Systems, 6th International

(56) References Cited

OTHER PUBLICATIONS

Conference on Applications of Natural Language to Information Systems, Revised Papers (Lecture Notes in Computer Science vol. 2553), Springer-Verlag, Berlin, Germany, 2002, vol. 2553, pp. 235-239.

Ruiz-Casado et al., "From Wikipedia to Semantic Relationships: A Semi-Automated Annotation Approach", 2006, pp. 1-14.

Florian et al., "Named Entity Recognition through Classifier Combination", 2003, IBM T.J. Watson Research Center, pp. 168-171.

Dekai Wu, A Stacked, Voted, Stacked Model for Named Entity Recognition, 2003, pp. 1-4.

Google, "How to Interpret Your Search Results", http://web.archive.org/web/20011116075703/http://www.google.com/intl/en/help/interpret.html, Mar. 27, 2001; 6 pages.

Razvan Bunescu et al., "Using Encyclopedic Knowledge for Named Entity Disambiguation", 2006, Google, pp. 9-16.

Silviu Cucerzan, "Large-Scale Named Entity Disambiguation Based on Wikipedia Data", Proceedings of the 2007 Joint Conference on Empirical Methods in Natural Language Processing and Computational Natural Language Learning, pp. 708-716, Prague, Jun. 2007.

Razvan Constantin Bunescu, "Learning for Information Extraction: From Named Entity Recognition and Disambiguation to Relation Extraction" The Dissertation Committee for Aug. 2007, The University of Texas at Austin, pp. 1-150.

Joseph Hassell et al., "Ontology-Driven Automatic Entity Disambiguation in Unstructured Text" Large Scale Distributed Information Systems (LSDIS) Lab Computer Science Department, University of Georgia, Athens, GA 30602-7404, ISWC 2006, LNCS 4273, pp. 44-57.

Levon Lloyd et al. "Disambiguation of References to Individuals" IBM Research Report, Oct. 28, 2005, pp. 1-9.

\* cited by examiner

| Facet | Related text and entities in Entity Database |
|---|---|
| film | director, starring, character |
| band | current members, former members, songs, albums, hits, record labels |
| song, album | recording artist |
| TV show | starring, creator |
| country | capital |
| musician | associated with, songs, albums, hits, record labels |
| actor | known for, associated with, characters, movies, television shows |
| soccer player, baseball player, basketball player, football player, lacrosse player, hockey player, cricketeer, rugby player, coach | current team, former teams, sports organizations |
| book | author |
| author | known for, book, newspaper, magazine, movie, television show |
| fictional character | played by, creator |
| website | author |
| business person | company |

Entity-Specific Enhancements

Fig. 7

| Facet | Keyword |
|---|---|
| film | trailer, stills, premiere |
| spiritual leader | religion |
| football player, football team, college football team | football |
| cell phone | device |
| electronics company | electronics |

Facet-Specific Enhancements

*Fig. 8*

| Facet | Category Name |
|---|---|
| olympic sports | sports |
| company | business |
| technology company | technology |

Category Limits

Fig. 9

KEYWORD-BASED SEARCH ENGINE RESULTS USING ENHANCED QUERY STRATEGIES

TECHNICAL FIELD

The present disclosure relates to methods, systems, and techniques for enhancing the effectiveness of keyword-based searches and, in particular, to methods, systems, and techniques for improving results generated using existing keyword-based search tools by enhancing queries with automatically generated disambiguation terms.

BACKGROUND

Keyword-based search engines like YouTube and Yahoo Image offer interfaces that assist users in finding relevant results for ambiguously-named topics. For instance, on Yahoo Image (http://images.search.yahoo.com), if the user is looking for images of the TV show "24" and types "24", the interface will present a list of items that begin with "24", including "24 TV show". When the user selects this latter option, the user is shown only images of the TV show. Thus, the user through direct contact with the search tool provides disambiguation information to select the option of interest.

More often than not, the simple name of an entity suffices to connect a user to a result about that entity, either because the name is inherently unambiguous (e.g., "Inxs"), or more likely, because the user's interests align sufficiently with those of the community of other users and content creators to enable creation of a system that distills a broad consensus about the meaning of the name. Nevertheless, there are domains in which names can be highly (and deliberately) ambiguous (e.g., movie names such as "W", album titles such as "Blue"), challenging even the most successful keyword-based search engines to find relevant results using only a name. Moreover, for those users whose interest in a name lies outside that broad consensus, success in finding a result pertinent to that interest using only the name is unlikely.

The past several years have seen a proliferation of search engine Application Programming Interfaces (APIs), enabling development of a wide range of "mash-up" applications that intermediate between the user and a search engine. In response to keyword queries, these APIs deliver not only web pages (e.g., Yahoo BOSS Web Search, Google Web Search, Microsoft Bing) and other text media (e.g., Yahoo BOSS News Search, Twitter), but also non-textual media. Services like YouTube, which provides access to videos, and Flickr, which provides access to images, permit users to upload text descriptions and keywords with their media offerings, thereafter permitting search by keywords. Services like Yahoo BOSS Image search and Microsoft Bing crawl the web, finding non-text media and using the text that accompanies these media for keyword annotation.

These search engine APIs enable the providing of a rich array of content to create compelling new applications. However, when such search engines offer an API to an intermediary application, the ability to engage the user's knowledge to make the search more specific by direct interaction is lost. Consequently, even though the user may have already declared an interest in a specific entity in the intermediary application, if this application retrieves results from a search API using only an entity's name, it may retrieve results that are mistakenly not about the entity of interest. Thus, by disengaging the user from direct interaction with the search engine, these API's sacrifice access to the disambiguation techniques based on user interaction, leaving them susceptible to the basic problems of ambiguity inherent in keyword search.

BRIEF DESCRIPTION OF THE DRAWINGS

FIG. 7 is an example block diagram of rules for creating Entity-Specific Enhancements.

FIG. 8 is an example block diagram of rules for creating Facet-Specific Enhancements.

FIG. 9 is an example block diagram of rules for creating Category Limits.

DETAILED DESCRIPTION

Figure 1:
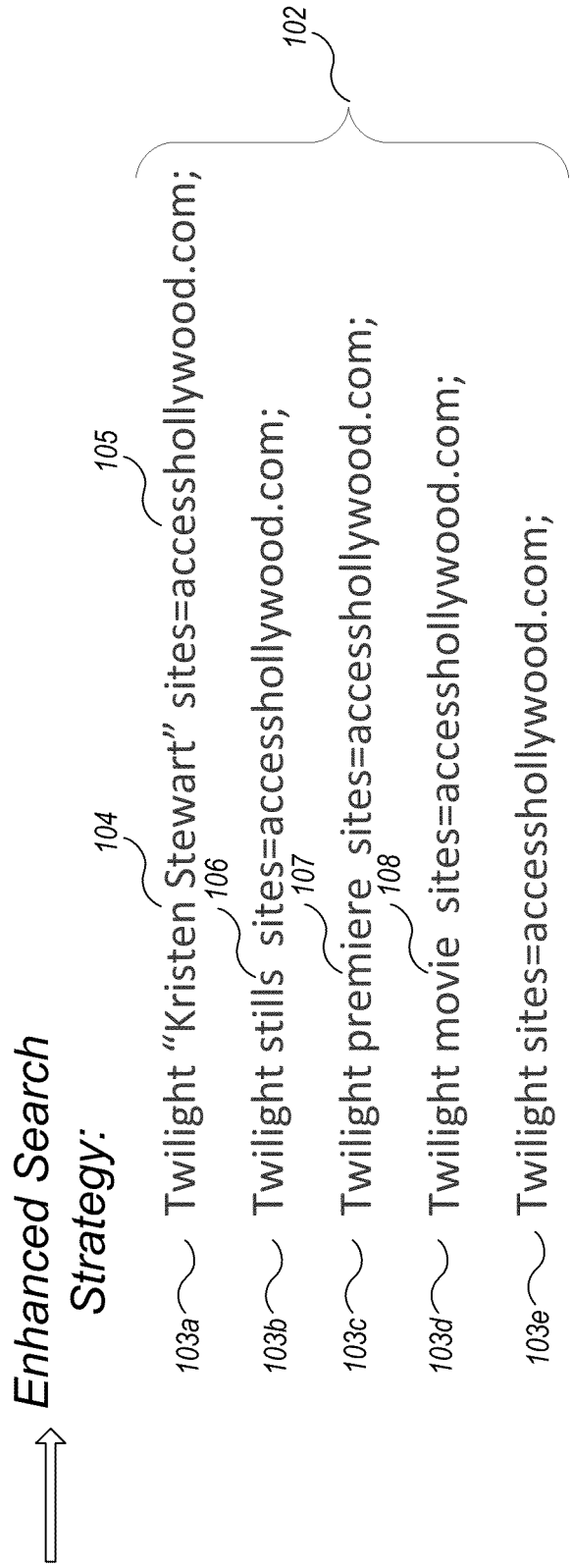
FIG. 1 is an example enhanced query according to example embodiments of a Keyword-Based Search Enhancement System.

Embodiments described herein provide enhanced computer- and network-based methods, systems, techniques for retrieving more accurate and responsive search results when searching content for a designated entity using a keyword-based search engine. For example, the embodiments described herein may be used to improve search results by eliminating off-topic results when presenting queries to an existing (e.g., off-the-shelf) keyword-based search engine invoked by means of an application programming interface (API) from an intermediating application such as a personalized news reporting service, social networking interface, etc. Example embodiments provide a Keyword-Based Search Enhancement System ("KBSES"), which enables intermediating applications to obtain information more closely related to user queries by enhancing such queries, on behalf of the user, with disambiguating information when deemed necessary. Based upon a variety of rules and heuristics, which can be modified as well, the KBSES determines whether an entity name in a user's query should be enhanced with additional disambiguating information, and to what extent, to prevent the retrieval of off-topic results. If the entity name is enhanced unnecessarily, or with too-specific information, then the result set retrieved from the search engine API may be too small (or empty), or otherwise too restrictive (e.g., the results may not include the latest, most compelling results).

For example, common types of relevancy errors addressed by embodiments of a KBSES include:

- Entity Name Matches to Non-entity: The user wants results for the boy band "Blue", but the query "Blue" returns results about things that are blue.
- Entity Name Is Substring of Different Entity's Name: The user wants results for the boy band "Blue", but the query "Blue" returns results about the movie "Blue Hawaii".
- Entity Name Matches to Wrong Entity, Wrong Facet: The user wants results for the boy band "Blue", but the query "Blue" returns results about the movie Joni Mitchell's album "Blue".
- Entity Name Matches to Wrong Entity, Right Facet: The user wants results for Joni Mitchell's album "Blue", but the query "Blue" returns results about Cher's album "Blue".

Here, the term "facet" refers to some aspect of the entity discoverable from an ontology or taxonomy of entities. Facets typically are more finely granular characteristics of entities, often times used to categorize entities. For example, particular entities may belong to different categories such as football players, movies, books, cities, etc. In one embodiment, entities are considered to be one or more of the following types: person, organization, location, concept, event, product, condition, organism, and substance. Facets may be used to describe certain characteristics incorporated to subcategorize them. Appendix A, incorporated herein by reference, includes a list of example facets for the various example entity types. Fewer or more can be made available, and the set of facets used by the KBSES are generally configurable.

In overview, in order to avoid such relevancy errors, the KBSES first determines whether the entity is one likely to yield such types of errors, as explained further below. If so, and subject to a variety of rules and/or factors, the KBSES determines using "enhancers" (enhancer components) what sort of disambiguation terms to apply to the keyword-based query, and then applies the determined disambiguation terms in a query strategy to a search to be invoked using the API. In some embodiments, portions of the query strategy are invoked and tested for sufficient results before continuing with further attempts to enhance the query.

FIG. 1 is an example enhanced query according to example embodiments of a Keyword-Based Search Enhancement System. As shown in FIG. 1, if the user enters a query 101 to find relevant information on the 2009 Teen Vampire Movie entity "Twilight," after enhancement, the KBSES might generate a query strategy 102 that can be represented as the string:

Twilight "Kristen Stewart" sites=accesshollywood.com;
Twilight stills sites=accesshollywood.com;
Twilight premiere sites=accesshollywood.com;
Twilight movie sites=accesshollywood.com;
Twilight sites=accesshollywood.com;

where each phrase separated by a semicolon is a separate query, which "sub-"queries are run on behalf of the user until sufficient relevant results are returned.

In this example, the entity-specific enhancement "Kristen Stewart" 104 is a related entity to the movie entity "Twilight" as determined using a variety of techniques that glean information about which entities are related to which other entities. The phrase "sites=accesshollywood.com" 105 is a source limitation that describes which corpus the search engine should preferably use for the query to prevent generating less relevant data. The facet-specific enhancements "stills" 106 and "premiere" 107 are terms related to a facet (i.e., film) of the particular entity of interest (i.e., the movie entity "Twilight" that refers to the particular 2009 Teen Vampire Movie). The category "movie" 108 is a category level enhancement. One or more enhancements may be provided in a single query strategy; and one or more types of enhancements may be omitted in any single query strategy.

As can be observed in this example, the ordering of the query enhancements within a particular query strategy is important, as it is meant to lead to a desired degree of precision without being too narrow. Thus, in the particular example demonstrated, the entity-specific enhancement is tried first, as it is deemed to be the most likely to produce results with greatest precision. The facet-specific enhancements may produce a greater number of results but they are likely to be less precise. For example, in the case of query 101, facet-specific enhancements may cause retrieval of some results related to other similar movies, for example "The Twilight Zone Movie." Similarly, the category level enhancement "movie" in combination with the name "Twilight" could cause retrieval of similar less precise results.

The ability to identify one or more entities that are related to a designated entity, making possible some of the enhancements of keyword queries with disambiguating terms, is predicated on the existence of entity recognition and disambiguation technology. One such method for providing entity recognition and disambiguation is described in detail in U.S. patent application Ser. No. 12/288,158, filed Oct. 15, 2008, and entitled "NLP-BASED ENTITY RECOGNITION AND DISAMBIGUATION," which is incorporated herein by reference in its entirety. In addition, the ability to select related entities that are the most useful in locating on-topic content is enhanced by the ability to detect and aggregate relationships between entities using representation schemes and query languages suited to entities and their relationships. One set of techniques using relationship searching technology is described in detail in U.S. Pat. No. 7,526,425, issued Apr. 28, 2009, and entitled "METHOD AND SYSTEM FOR EXTENDING KEYWORD SEARCHING FOR SYNTACTICALLY AND SEMANTICALLY ANNOTATED DATA," which is incorporated herein by reference in their entirety.

The use of entity recognition and disambiguation technology enables an intermediating application to specify a user's interest as a designated entity instead of a keyword query. This flexibility enables the KBSES to construct keyword queries that, despite being processed by a search engine's API that does not have entity recognition and disambiguation technology, are nevertheless able to retrieve content relevant to the designated entity. For example, if the user is interested in the French city of "Paris," the KBSES can produce a keyword query that is capable of retrieving content for the particular city, and not the celebrity "Paris Hilton"—even from a keyword-based search engine API that has no entity recognition and disambiguation capabilities or semantic understanding of the query.

As mentioned, the KBSES improves keyword-based queries by automatically generating disambiguation terms which are used to supplement the otherwise unmodified queries to generate more precise results. As described herein, the KBSES operates to enhance queries used with the API of third-party, off-the-shelf keyword-based search engines, especially in the context of being invoked from another application on behalf of a user. These third-party keyword-based search engines may be operable to search lots of different types of content, including for example, text, images, music, sound, video, objects etc.

The techniques of the KBSES also may be useful to enhance queries in other scenarios and with other kinds of search engines. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement a Keyword-Based Search Enhancement System to be used provide enhanced keyword-based queries. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the code flow, different code flows, etc. Thus, the scope of the techniques and/or functions described are not limited by the particular order, selection, or decomposition of steps described with reference to any particular routine.

Figure 2:
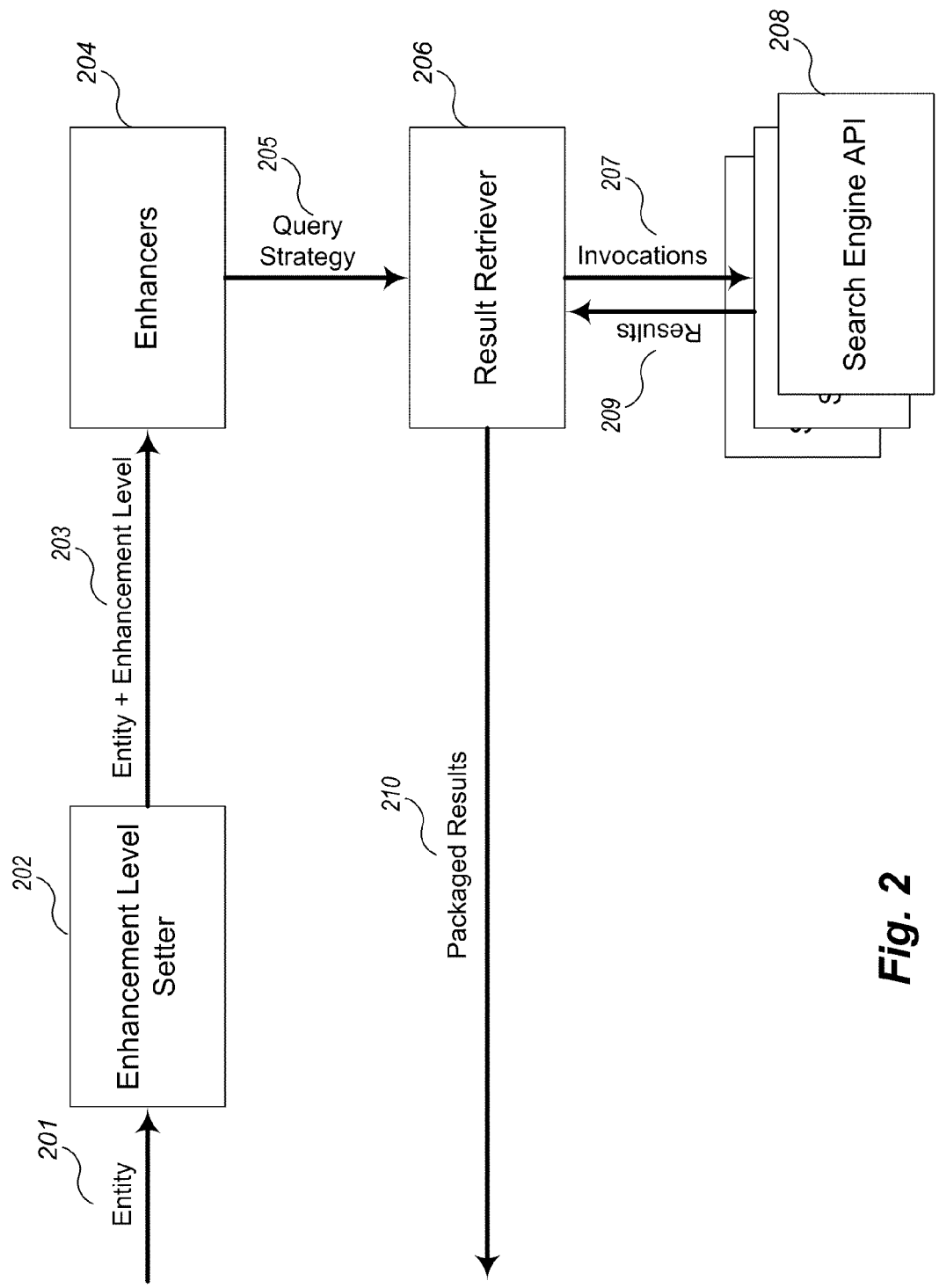
FIG. 2 is an example block diagram of components of an example Keyword-Based Search Enhancement System.

FIG. 2 is an example block diagram of components of an example Keyword-Based Search Enhancement System. In one embodiment, the Keyword-Based Search Enhancement System comprises one or more functional components/modules that work together to enhance keyword-based queries, performed using one or more API, so that they provide more relevant and/or accurate results, for example, ultimately to a user. These components may be implemented in software or hardware or a combination of both. As shown in FIG. 2, the KBSES comprises an Enhancement Level Setter 202, one or more Enhancers 204, and a Result Retriever 206.

Typically, an intermediating application (not shown) uses the facilities of the KBSES to generate and use enhanced queries. Specifically, upon receiving an entity designation 201, the intermediating application first uses the Enhancement Level Setter 202 to set an enhancement level 203 for the query, i.e., to determine whether enhancements are needed, and how specific the enhancements should be. Levels of specificity include for example, a level that indicates a desire to include enhancements specific to the entity or a level that indicates a desire to include enhancements specific to the facet of the entity. In other embodiments, other levels may be indicated.

The intermediating application then passes information regarding the enhancement level 203, along with an unambiguous designation of a specific entity 201, to the set of one or more Enhancers 204. The set of Enhancers 204 are configurable and may differ from implementation to implementation. Each Enhancer 204 supplies some piece of information about the entity that can be used to formulate a query (i.e., one of the sub-queries) to the search engine API 208. Examples of Enhancers 204 include:

Facet-level Enhancer: A Facet-level Enhancer supplies a keyword or phrase related to the designated entity's facet (e.g., "football" if the entity is a college football player, or "trailer" if the entity is a movie).

Category Enhancer: A Category Enhancer supplies a high-level content category based on an entity's facet (e.g., for the entity corresponding to the Olympic sport "skeleton," this enhancer would supply the high-level category "sports".

Entity Database Enhancer: An Entity Database Enhancer supplies a keyword or phrase specifically about the designated entity, drawing on static properties of the entity in a designated entity store, such as the EVRI entity store. For example, for the entity corresponding to the 70's band "Mountain," the Entity Store enhancer would provide the musician name "Leslie West," and the song name "Mississippi Queen."

Source Selection Enhancer: A Source Selection Enhancer supplies sites or authors that should be preferred or avoided when searching through the search engine API for results relevant to the designated entity.

Related Entity Enhancer: A Related Entity Enhancer supplies a keyword or phrase corresponding to the name of an entity or action that co-occurs frequently in a chosen corpus of texts. For instance, at the time of the Mumbai terrorist attack in late 2008, this enhancer could have supplied the keyword "attack" for the entity corresponding to Mumbai, because the keyword "attack" frequently occurred in conjunction with the entity name Mumbai during that time period.

The Enhancers 204 produce a "query strategy" 205—a list (or collection) of queries, typically from most restrictive to least restrictive. At this point, in one embodiment, the queries in the query strategy 205 are abstract—they are not yet in the syntax of any search engine API. Each query in the query strategy 205 consists of a set of "root terms" (e.g., the name of the entity), enhancing keywords/phrases, content categories, and source limitations. An example of such a query strategy was illustrated with reference to FIG. 1.

Finally, the intermediating application passes the query strategy 205 to the Result Retriever 206, which is responsible for formulating queries in the syntax of the desired search engine API 208. The Result Retriever 206 goes through the sub-queries of the query strategy 205 in order (most specific to least specific) until it determines that it has sufficient results (e.g., over some threshold number of results). The Result Retriever 206 formats the results 209 into objects that are interpretable by the intermediating application, such as packaged results 210, and then returns them.

The Enhancement Level Setter of the KBSES (e.g., Enhancement Level Setter 202 of FIG. 2) is used to determine whether enhancements are needed and how specific the enhancements should be. The enhancement level (enhancement type) generated conveys at least three types of information: 1) whether an entity-specific query enhancement is needed (e.g., enhancing the TV show name "24" with the actor name "Kiefer Sutherland" may be needed to differentiate that show from others); 2) whether a facet-specific query enhancement is sufficient, since facet-specific enhancements may prevent the results generated from being too narrow; and 3) whether or not the unenhanced query should be tried if the enhanced (sub-) queries fail to provide sufficient results. For example, a highly ambiguous name like "X" is highly unlikely to provide relevant results from any search engine if it is submitted unenhanced.

Figure 3:
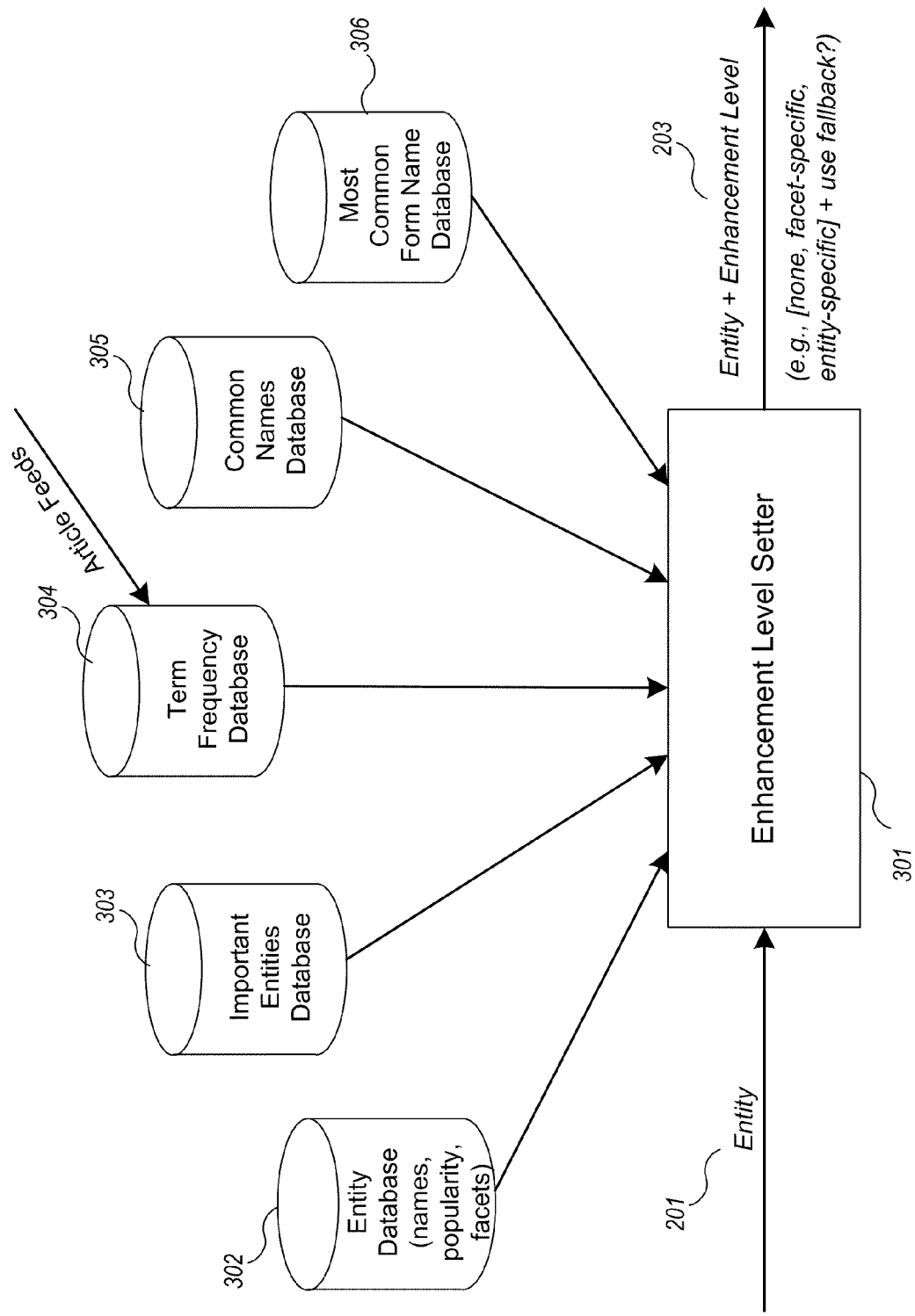
FIG. 3 is an example block diagram of components of an example Enhancement Level Setter of an example embodiment of a Keyword-Based Search Enhancement System.

FIG. 3 is an example block diagram of components of an example Enhancement Level Setter of an example embodiment of a Keyword-Based Search Enhancement System. The Enhancement Level Setter 301 includes logic that draws on the following resources to decide whether enhancement is necessary to prevent the name of the entity in question from retrieving off-topic results from a search engine API: an Entity Database 302, an Important Entities Database 303, a Term Frequency Database 304, a Common Names Database 305, and a Most Common Form Name Database 306. Although referred to in the examples herein for use with a keyword-search engine API, the described techniques may be used in conjunction with search engines directly (for example, as components embedded within them) or with other types of search engines.

The Entity Database 302 is a database containing the names and facets of known entities (recognized entities), along with an indicator of each entity's popularity. Different mechanisms may be used to determine an entity's popularity. In one instance, the number of links to the entity's Wikipedia page from other Wikipedia pages is used as a measure of popularity. Other embodiments incorporate information optionally from a server of "hot" (popular) entities. In at least one embodiment, a popular entity server, known as "Zeitgeist," tracks which entities are currently popular and reports this data as needed. In some embodiments Zeitgeist tracks the first derivative of mentions of entities, in order to observe "spikes" in activity—not just amount.

The Important Entities Database 303 is a list of entities that do not need enhancement. In one embodiment, this list is hand-curated, representing the judgment of the curator that these entities are so overwhelmingly popular compared to other entities that have the same name, that there is very low risk of retrieving results for the other incorrect entities. For instance, Michael Jackson the entertainer appears in this list; conversely, Michael Jackson the football player does not. In some cases this list is time sensitive and so can be monitored and revisited at determined intervals.

The Term Frequency Database 304 is a measure of the rareness of terms and phrases in common usage. In one embodiment, the names, phrases, and the measures of rareness are derived from a corpus of news articles and calculated at various time periods and/or intervals. In some embodiments, the Term Frequency Database 304 is an off-the-shelf database.

The Common Names Database 305 is a list of common first names and a list of common last names. In one embodiment, these lists are hand-curated. If a name consists of one word, it is considered common; if it consists of three or more words, it is considered uncommon; if it consists of two words, it is considered common if the first word appears on the given names list, and the second must appear on the family names list. Other heuristics are of course possible and can be similarly incorporated.

The Most Common Form Name Database 306 is a database of the most common variants of entity names. In one embodiment, this information is derived from a corpus in which entity occurrences have been detected.

In some embodiments, one or more of the resources 302-306 are provided through external third-party resources.

Figure 4:
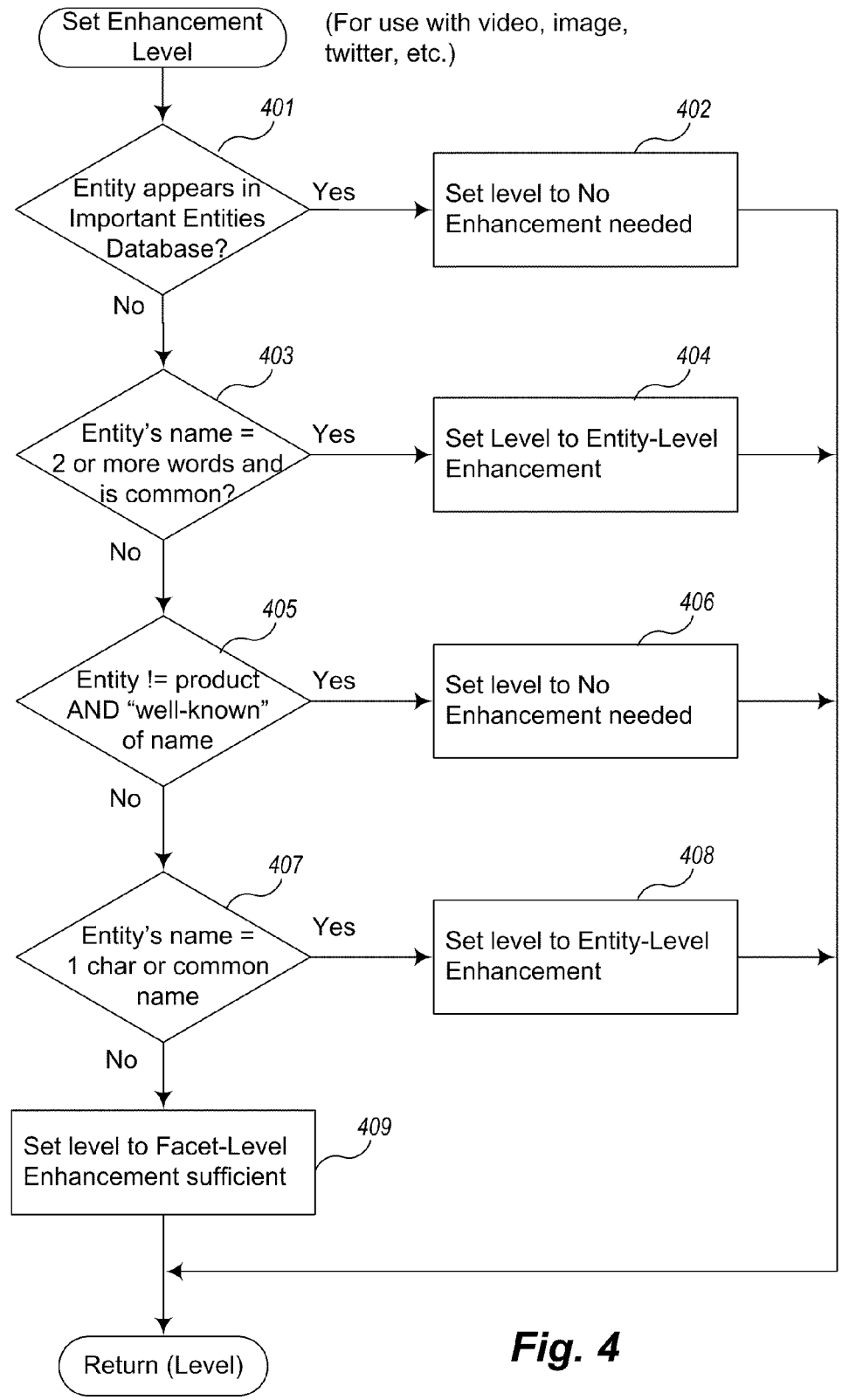
FIG. 4 is an example flow diagram of logic used by an example KBSES to set an enhancement level for queries submitted to Yahoo! BOSS Image Search, YouTube video search, and Twitter search APIs.

FIG. 4 is an example flow diagram of logic used by an example KBSES to set an enhancement level for queries submitted to Yahoo! BOSS Image Search, YouTube video search, and Twitter search APIs. In one embodiment this logic is executed by the Enhancement Level Setter 301 of FIG. 3. In block 401, if the entity appears in the Important Entities Database 303, then in block 402, no enhancement is necessary, and the logic returns.

Otherwise, in block 403, if the designated entity's name (e.g., retrieved from either the Entity Database 302 or the Most Common Form Name Database 306) consists of two or more words and is a "common" name (for example, as determined by the Common Names Database 305), then entity-specific disambiguation would be helpful and the level is correspondingly set to entity-level enhancement in block 404, and the logic returns.

In block 405, if the designated entity is not a product and is "well known," then no enhancement is necessary and, in block 406, the level is correspondingly set to no enhancement needed, and the logic returns. Here, whether the entity is well-known is determined by whether the entity's popularity score accounts for 99% or more of the popularity scores of entities with a similar name (as determined using either the Entity Database 302 or the Most Common Form Name Database 306), Otherwise, some form of enhancement is beneficial. For example, in block 407 if the entity's name is one character long, or if the entity's name is common, then the enhancement is preferably entity-specific. In block 408, the level is correspondingly set to entity level enhancement, and the logic returns. (Furthermore, if results are not available with the entity-level enhancement, then no attempt should be made to retrieve results without enhancement, since they will not only be off-topic, but appear to be random.) Otherwise, as indicated by setting the level to a facet-level enhancement in block 409, if later no results are forthcoming with a query that is enhanced with entity-specific information, then a query that is enhanced with facet-level information will be adequate.

Applying this logic, consider the following examples:
Michael Jackson the entertainer will need no enhancement as the entity appears in the Important Entities database.
Michael Jackson the football player will need entity-specific enhancement because the entity does not appear in the Important Entities database, it is a 2-word name, and appears in the Common Names database.
Ted Kennedy the politician will not need enhancement. Although his entity does not appear in the Important Entities database, his popularity score accounts for more than 99% of the aggregated popularity scores of entities with similar names (e.g., consider Ted Kennedy the hockey player).
The TV show "24" needs entity-specific enhancement. It does not appear in the Important Entities database. Although it may be popular enough that its popularity score accounts for more than 99% of the aggregated popularity scores of entities whose names contain "24", it is determined to need enhancement because it is a product. Furthermore, since its name is a common term, the enhancement is preferably at the entity level. Finally, if sufficient results cannot be retrieved from the search engine API using entity-level enhancement, then the search should be abandoned; a search using only the term "24" will retrieve seemingly random off-topic results.

Figure 5:
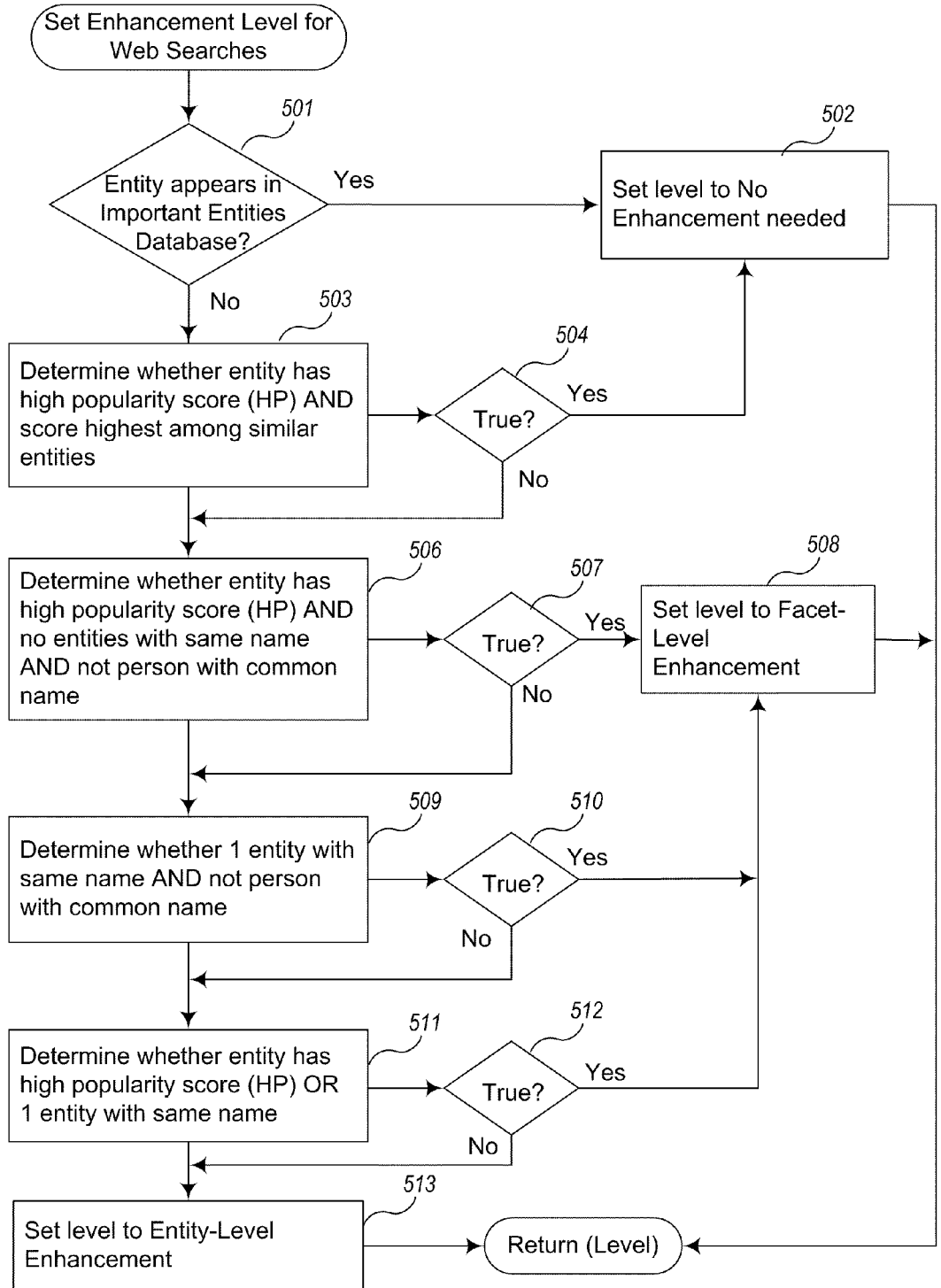
FIG. 5 is an example flow diagram of logic used by an example KBSES to set an enhancement level for queries submitted to Yahoo! BOSS Web Search API.

FIG. 5 is an example flow diagram of logic used by an example KBSES to set an enhancement level for queries submitted to Yahoo! BOSS Web Search API. In this case, in block 501, if the designated entity appears in the Important Entities database, no enhancement is necessary, and, in block 502, the level is correspondingly set to no enhancement needed, and the logic returns.

Otherwise, the KBSES determines in block 503 whether the entity has a sufficiently high popularity score (in this embodiment, Wikipedia in-links), and whether its score is the highest among similarly-named entities. In block 504, if so, then enhancement is not necessary and the logic continues to block 505 to set the enhancement level to no enhancement needed, and returns.

In block 506, the KBSES determines whether the entity has a sufficiently high popularity score, if there are no other entities with the same name, and if the designated entity is not a person with a common name. In block 507, if this test evaluates to true, then facet-level enhancement should be tried, but is not necessary, and in block 508, the KBSES logic sets the enhancement level to facet-level enhancement, and returns.

In block 509, the KBSES determines whether there is one other entity with the same name, and if the designated entity is not a person with a common name. Whether an other entity has the same name can be determined using either the Entity Database 302 or the Most Common Form Name Database 306. In block 510, if this test evaluates to true, then facet-level enhancement should be tried, but is not necessary, and in block 508, the KBSES logic sets the enhancement level to facet-level enhancement, and returns.

Similarly, in block 511, the KBSES determines whether the designated entity has a sufficiently high popularity score or whether there is only one other entity with the same name. In block 512, if this test evaluates to true, then facet-level enhancement should be tried, but is not necessary, and in block 508, the KBSES logic sets the enhancement level to facet-level enhancement, and returns.

Otherwise, in block 513, entity-level enhancement should be tried and the KBSES logic sets the enhancement level to entity-level enhancement, and returns.

Figure 6:
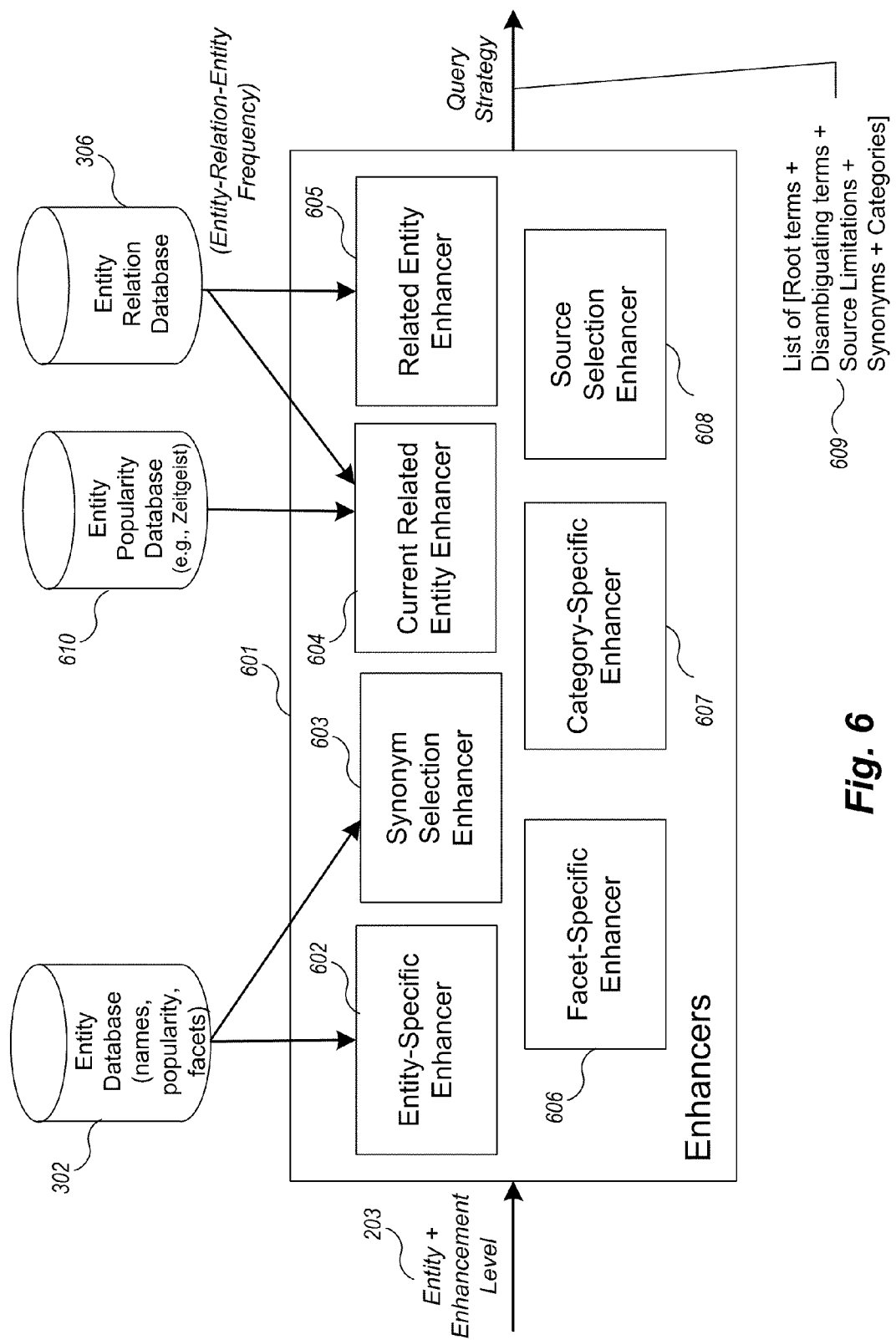
FIG. 6 is an example block diagram of a plurality of example Enhancers used to generate an enhanced query strategy in an example embodiment of a Keyword-Based Search Enhancement System.

FIG. 6 is an example block diagram of a plurality of example Enhancers used to generate an enhanced query strategy in an example embodiment of a Keyword-Based Search Enhancement System. The Enhancers comprise a group of (e.g., configurable) modules that, given a precise known entity and an indication of the level of enhancements that should be tried, construct an abstract representation of a sequence of enhanced queries denoted a "query strategy." This abstract representation is then formulated into specific search statements by the results retriever (for example Result Retriever 206 in FIG. 2) for invocation of the intended search engine using the search engine's API. As described above, an enhanced query strategy, for example query strategy 609, typically comprises one or more queries, which each comprise one or more root terms enhanced with zero or more disambiguating terms, source limitations, synonyms, and categories. Note that the terms in an enhanced query are combined in a Boolean "AND" operation as opposed to combined in a Boolean "OR" operation.

In one embodiment, the enhancers comprise one or more of: an Entity Specific Enhancer 602, a Synonym Selection Enhancer 603, a Current Related Entity Enhancer 604, a Related Entity Enhancer, a Facet-Specific Enhancer 606, a Category-Specific Enhancer 607, and a Source Selection Enhancer 608. In other embodiments, other enhancers may be included and/or some of the illustrated enhancers excluded. Each Enhancer contains logic for determining disambiguation terms to be added to a root term (i.e., a term that represents the designated entity) to create an enhanced query. To facilitate such determinations the logic may incorporate a set of rules/heuristics, as exemplified with reference to FIGS. 5-7 described further below. In addition, some enhancers utilize information stored in one or more data repositories/data stores, for example one or more Entity Database 302, Entity Popularity Database 610, and/or Entity Relation Database 306. Other enhancers and other embodiments may utilize other types of data repositories in addition or instead of the ones illustrated in FIG. 6.

In the example shown, Entity Database 302 contains information on entities, such as their facets (see Appendix A for an example list of facets) and their other roles or properties. Each property generally comprises a name, value pair, where the value may be text or an indication of another entity in the database. Other data such as popularity information, common names, synonyms, representative icons, etc. may also be stored. Entity Popularity Database 610 generally comprises an indication of what entities are being accessed the most by some source, such as mined from a corpus of articles. The Entity Specific Database 306 generally comprises an indication of all of the entity-relation-entity (e.g., subject-verb-object) relationships, with an indication of frequency, across some corpus, for example, a set of articles.

Each of enhancers 601 is responsible for determining disambiguating terms, if the given a level of enhancement indicates that the enhancer is to be invoked. Entity-Specific Enhancer 602 is responsible for appending disambiguating terms that are specific to the designated entity (i.e., entity 201 in FIG. 2). The terms may come from text that is associated with the entity through a role (as a value of a property associated with the designated entity), or from other entities that are associated with the designated entity. These other entities may be associated with the designated entity via specific roles (the other entity is a value of one of the properties associated with the designated entity), or may simply be related to the entity in an unspecified manner.

In an example embodiment, disambiguation terms are determined by the Entity-Specific Enhancer 602 in the presence of particular facets. These facets have been determined heuristically and/or empirically based upon a set of priorities, including 1) the importance of particular subjects; 2) the number of entities having a facet; 3) the tendency of the names of the entities having that facet to be ambiguous; and 4) the frequency of viewings of entity descriptions (i.e., entity pages) relating to the entities having that facet. FIG. 7 is an example block diagram of a set of rules for creating Entity-Specific Enhancements. These rules can be used, for example, by the Entity-Specific Enhancer 602 in FIG. 6 and are based upon a set of facets of interest. The set of rules 700 is demonstrated as a table of facets 701 and disambiguation rules 702. For each of the named facets 701, the rules 702 list one or more properties, which may have either text or other entities as values.

For example, if the designated entity is a football player (has a facet of "football player" 705), then text that appears as the value of a "current_team" property 706 would be included as an enhancing term. In addition, an entity that is related to the football player entity and that has the characteristic of being a football team (shares the "football team" facet), would also be included as an enhancing term. In addition, the (typically most common) name of any entity that appears as the value of one of the properties of the "football player" facet 705, namely the current_team property 706, the former_teams property 707, or the sports organizations property 708, may also be including as an enhancing term.

The Synonym Selection Enhancer 603 is responsible for adding synonyms to the designated entity. In one embodiment, the Entity Database 302 includes synonyms for the names of entities. Instead of adding these synonyms unconditionally, the Synonym Selection Enhancer 603 uses an external query suggestion service (such as Yahoo! BOSS keyterms search, or Google Suggest) to find common query suggestions for the designated entity's name, and then, when these overlap with the designated entity's synonyms as stored in the Entity Database 302, includes the overlapping terms as enhancements. For example, for the entity that is the magazine Time, the simple name "Time" is highly ambiguous, but the entity record in the Entity Database 302 also includes "Time Magazine" as a synonym. If the third party suggestion service (e.g., Google Suggest) returns "Time Magazine" as a suggestion for "Time," the Synonym Selection Enhancer 603 will add "Time Magazine" as a disambiguating term enhancement.

The Facet-Specific Enhancer 606 is responsible for generating enhancing terms that are not specific to an entity, but rather to designated entities' facets. FIG. 8 is an example block diagram of a set of rules for creating Facet-Specific Enhancements. These rules can be used, for example, by the Facet-Specific Enhancer 606 in FIG. 6 and also are based upon a set of facets of interest. The set of rules 800 is demonstrated as a table of facets 801 and disambiguation rules 802. For each of the named facets 801, the rules 802 list one or more keywords to be added as disambiguation terms.

For example, for entities that are films (share the "film" facet 805) terms 806 like "trailer," "stills," or "premiere," appended to the film title, tend to increase the chances of getting on-topic results. Thus, they are added as disambiguating terms. As another example, for entities that are electronic devices having facet 807 (e.g., Blackberry, Palm), the enhancing term "electronics" is likely useful to get on-topic results. Thus, it is added as a disambiguating term.

In another embodiment, a Facet-Specific Enhancer, such as Enhancer 606 in FIG. 6, can operate to "substitute," for facets, one or more named entities as keywords that serve as disambiguation terms. That is, for some queries which involve a facet as a designated entity rather than a name of a person, place, thing, etc., a Facet-Specific Enhancer can be used to find example named entities that are more likely to result in the desired information than the facet by itself. These entities (which may act as proxies for the facet) can be then used to replace or augment the facet as disambiguating terms.

For example, suppose a user is interested in finding videos of celebrities (a facet) who have been arrested. In order to get this information from a standard off-the-shelf keyword search engine, the query would need to be expanded with specific people's names in order to find the videos, since the search engine will not know how to "translate" the facet description into matching particular celebrities. An expanded query may look something like "arrest AND ("Brad Pitt" OR "Heidi Klum" OR "Jennifer Lopez"), etc. The challenge is in figuring out how to expand the facets appropriately to get the most on-topic results, given that there are probably tens of thousands of named entities that might be used as proxies for the facet.

One solution is to look up the most popular actors in a popularity database or system (such as the Entity Popularity Database 610 in FIG. 6), and expand the query into the most popular N people in each facet. However, if the most popular people are not being arrested, and if a previously unpopular actor (e.g., at a popularity rank 50) is being arrested, then the enhanced query is not going to obtain any results.

Another solution is to instead run a query (for example using a relationship search engine identified in U.S. Pat. No. 7,526,425) against a local semantic index with a subset of articles to identify entities that are likely to match a full semantic query, and then use those entities as proxies for the facet—i.e., for facet-expansion in a third party keyword-based search. Then, if the local index has even a couple of articles about Brad Pitt being arrested, it is sufficient to identify him as eligible for facet expansion/substitution.

More specification, given a semantic search engine S, an external keyword search engine E, and a semantic query Q containing facets F, facet expansion is accomplished by:
1. Issue query Q against S to obtain response R;
2. Define a new query Q2 which is derived from Q by replacing every occurrence of F with an OR statement that Ors all of the entities in the response R;
3. Issue query Q2 against E.

Adjustments based upon the results can of course be accommodated. For example, if there are too many entities in the response R that match query Q, they can be rank ordered by popularity, or otherwise, and the top 'n' chosen.

Note that at least in some embodiments, the Facet-Specific Enhancer 606 is not invoked if the enhancement level setting indicates that entity-specific enhancement is necessary. (Facet-specific enhancement typically yields broader results than a corresponding entity-specific enhancement so it would not likely be helpful in such a scenario.)

The Category-Specific Enhancer 607 is responsible for generating enhancing terms that are not specific to a designated entity or to the entities' facets, but rather to broad categories of content. This enhancer also differs from the Entity-Specific Enhancer 602 and Facet-Specific Enhancer 606 because, rather than add enhancing terms that will be supplied as keywords to a search engine API, it places a category name in a distinguished field in the query, so that the Result Retriever can use the category name as a category-limiting parameter to the search engine API, if the API supports such a category limitation.

In one embodiment, the potential category names are again based upon a set of facets of interest. FIG. 9 is an example block diagram of a set of rules for creating Category-Specific Limitations. These rules can be used, for example, by the Category-Specific Enhancer 607 in FIG. 6. The set of rules 900 is demonstrated as a table of facets 901 and limitation rules 902. For each of the named facets 901, the rules 902 list one or more categories that may potentially be added as category-limiting parameters.

The Source Selection Enhancer 608 is responsible for supplying sources (such as website domains or content authors) to prefer or to avoid, based on a designated entity's facet. This enhancer places source designations in distinguished fields in the query, so that the result retriever (e.g., Result Retriever 206 in FIG. 2) can use these designations as source-limiting parameters to the search engine API, if the API supports a source limitation.

The Current Related Entity Enhancer 604 is responsible for adding queries to the query strategy that are premised on providing timely interesting content. This enhancer differs from the Entity-Specific Enhancer 602 and Facet-Specific Enhancer 606 in that it is not used to overcome the ambiguous naming of entities. Rather, it is used to promote content related to the designated entity that is especially interesting at the moment. For example, when Captain Chesley 'Sully' Sullenberger landed a US Airways jet on the Hudson River, queries to search engine APIs for "US Airways" returned results that were unambiguously about the airline, but top results from some search engine API's were not about the landing on the Hudson (even though they could access content related to the incident).

Given an entity, the Current Related Entity Enhancer 604 determines whether there are actions or entities that have had an unusually high rate of mention in relation to the designated entity over the past few hours (compared to the rate over a longer period, such as a week), in a stream of news content. If there are such entities or actions, then they are added to the query strategy in a way that would facilitate obtaining on-topic results. In one embodiment the Current Related Entity Enhancer 604 uses an Entity Popularity Database 610 which tracks such "hot" entities and actions.

Thus, on the day of the landing on the Hudson, the query strategy for the entity "US Airways" might have been:
"US Airways" Hudson;
"US Airways"
And on the day of the terrorist attacks in Mumbai in late 2008, the query strategy for entity "Mumbai" might have been:
Mumbai attack;
Mumbai The Related Entity Enhancer 605 is responsible for adding queries to the query strategy that provide interesting content based upon entity-relationships. Specifically, in one embodiment this uses a database (e.g., Entity Relation Database 306 in FIG. 3) of entity-relation-entity triplets that are extracted from a corpus of news articles and web documents generated using entity extraction and natural language disambiguation technology. It generates queries consisting of an entity's name, and entities that are highly related to the that entity.

As explained, which enhancers 601 of FIG. 6 are used to enhance a query for a designated entity depends upon the enhancement level indicated during an initial phase of determining what enhancements may be helpful. For example, if the enhancement level (indicated, for example, by the Enhancement Level Setter 301 of FIG. 3) indicates that entity-level enhancement is required, then the query strategy for the entity "Twilight" (the teen vampire movie) might be enhanced by the Entity-Specific Enhancer 602 to:

twilight "kristen stewart" "Catherine Hardwicke"

In this case, the names of the main actor and director of the movie (the values of the starring character and director properties 704 of film facet 703) are appended to the title of the film. Since entity-level enhancement was deemed necessary, in this embodiment, the query strategy does not include any queries with less specific, facet-level disambiguation terms.

If entity-level enhancement were not deemed necessary, then instead the Facet-Specific Enhancer 606 may be invoked to modify the query strategy to:

twilight "kristen stewart" "Catherine Hardwicke";
twilight premiere
...

In this case, the second query contains the term "premiere," added because the facet of the designated entity is film (e.g., facet 805), and, as the Rules 800 indicate, the "premiere" is a keyword worthy of addition. (The terms "trailer" and "stills" may also be added.)

Finally, the query strategy may additionally include source limitations, limiting results to those from sites that are highly likely to be about films. For example, the query may be further enhanced by the Source Selection Enhancer 608 to:

twilight "kristen stewart" "Catherine Hardwicke" site=accesshollywood.com;
twilight premiere site=accesshollywood.com In this case, both queries in the query strategy limit results to those from a site dedicated to films called "accesshollywood.com."

Turning to another example, suppose the designated entity is for "skeleton," the Olympic sport. For entities with the facet "Olympic Sport" 905, the Category-Specific Enhancer 607 determines that limiting results to the broad category of "sports" 906 is generally sufficient to get on-topic results. Since some search engine API's enable the specification of categories of results, the query strategy has a special field for high-level (e.g., broad) categories. Later, when the query strategy is translated into a set of concrete calls to the search engine API, if the API is capable of limiting results by category, then the Result Retriever 206 will be responsible for translating the KBSES category field into the appropriate API parameter. In this case, the resulting query strategy would be:

skeleton category=sports

In the query strategies illustrated above, each query included some type of enhancement. In some cases, however, in the process of setting an enhancement level, it may be determined that no enhancement is required. In such cases, the resultant query strategy may be just one query, with only root terms. For example, "eternal sunshine of the spotless mind"

In addition, in some cases, even if an enhancement is preferred, if the enhanced queries do not provide sufficient results (for example, some defined or configurable number or value), an unenhanced query may stand a good chance of getting mostly relevant results. In this case, the KBSES adds the unenhanced query as the last query in the query strategy as a "fallback." For example, suppose the entity in question is the album "The Stranger" by Billy Joel. If the Enhancement Level Setter 202 determines that the unenhanced query has a reasonable chance of retrieving on-topic results, although an enhanced query would give better results, the query strategy may be constructed as:

"the stranger" "billy joel";
"the stranger"

Other combinations of invoking the various enhancers and alternative logic within each enhancer can be similarly incorporated.

Figure 10A:
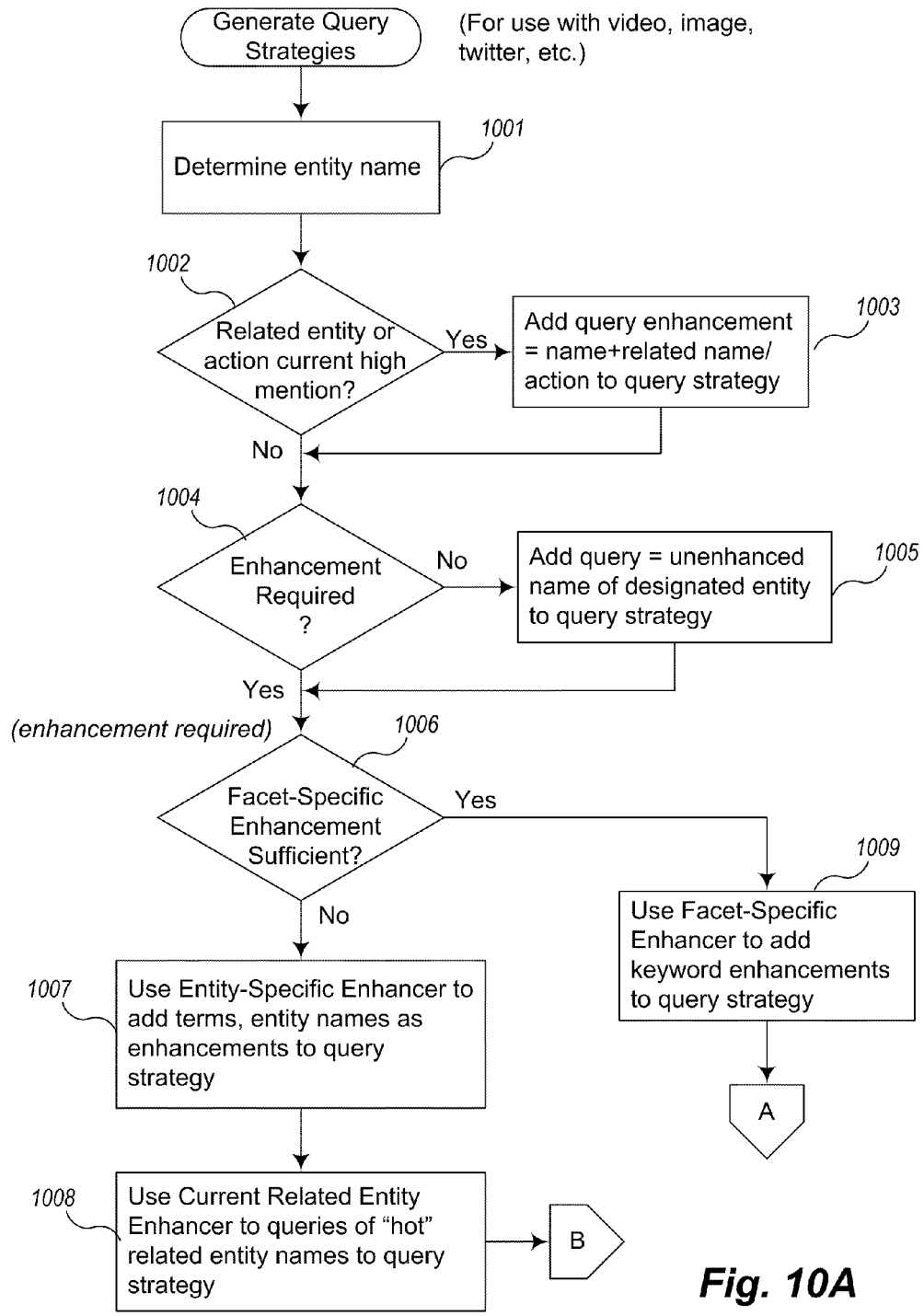
FIGS. 10A-10B are an example flow diagram of logic used by an example KBSES enhancers to generate query strategies for Yahoo! BOSS Image Search, YouTube video search, and Twitter search APIs.
Figure 10B:
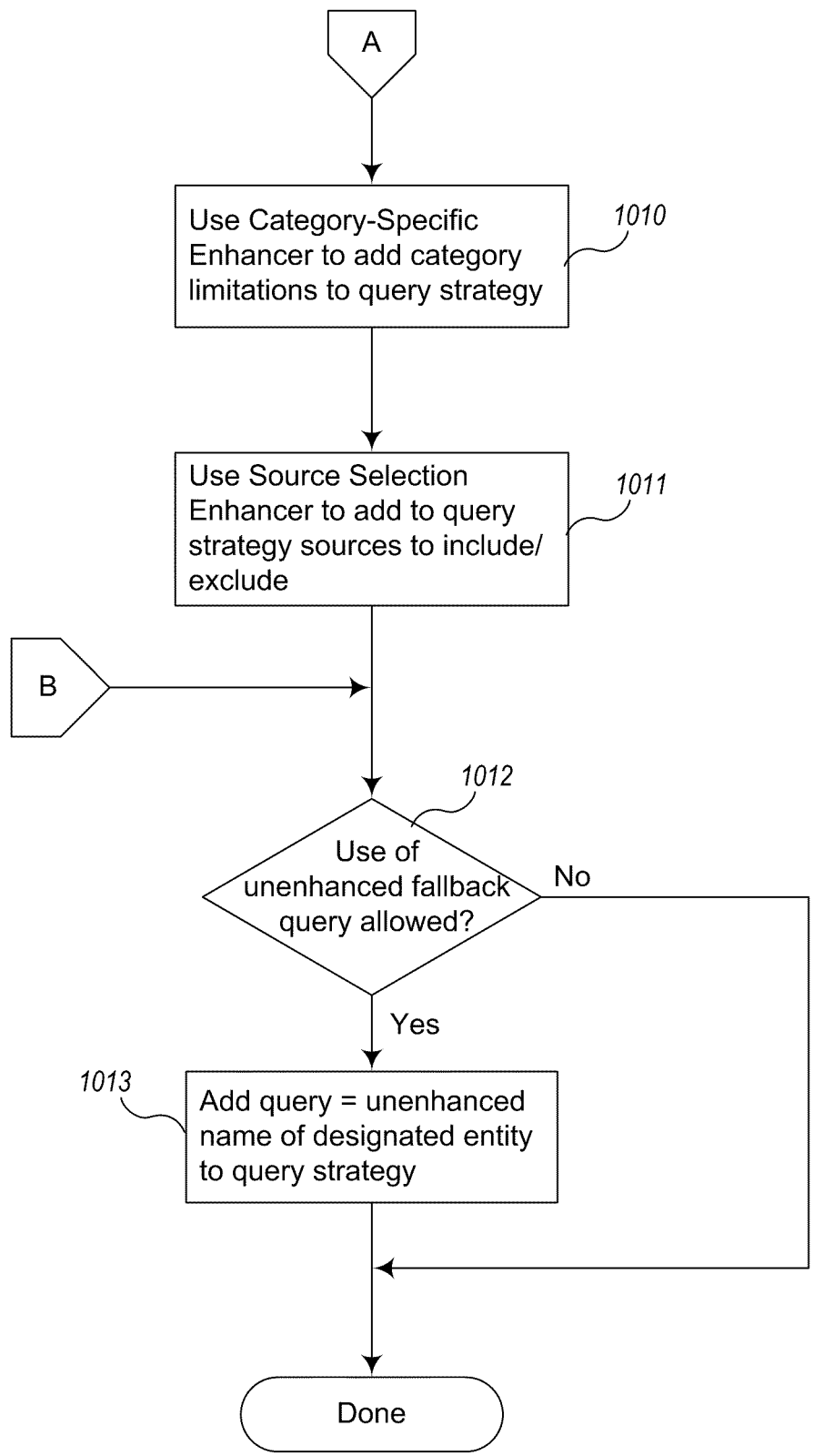

For example, the enhancers may be used in different ways to generate query strategies for image/video/twitter type search API and for web search API. FIGS. 10A-10B are an example flow diagram of logic used by an example KBSES enhancers to generate query strategies for Yahoo! BOSS Image Search, YouTube video search, and Twitter search APIs. In block 1001, the (enhancer logic of the) KBSES determines the entity name. The name of the entity can be the name obtained from the Entity Database 302. Alternatively, if there is a most-common-form name for the entity in the Most Common Form Name Database 306, then the KBSES may use that name.

In block 1002, the KBSES invokes the Current Related Entity Enhancer 604 to determine whether there is a related entity or action for the designated entity that has uncharacteristically high mention in a stream of current news sources (or other timely content stream). If so, in block 1003 the Current Related Enhancer 604 adds a query to the query strategy consisting of the name of the designated entity (from block 1001) and the related entity or action. If not, the KBSES continues in block 1004.

In block 1004, the KBSES determines whether an enhancement at all is needed, based upon the determination of an Enhancement Level Setter. If not, then in block 1005 the KBSES adds the unenhanced name of the designated entity as a query to the query strategy. If any kind of enhancement is indicated based upon the determination of the Enhancement Level Setter, then the KBSES continues in block 1006.

In block 1006, the KBSES determines if a facet-level enhancement was indicated as sufficient, as determined by a Enhancement Level Setter, and if so, continues to process facet level enhancements in blocks 1009-1011, otherwise continues in block 1007. In block 1009, the KBSES invokes the Facet-specific Enhancer 606 to add queries to the query strategy, where each added query consists of the entity name (from block 1001), and a keyword that is associated with the designated entity's facet, as specified in the description of the Facet-Specific Enhancer 606 above. In this case, the facet-keyword associations have been hand-curated, selected for their ability to retrieve relevant results from the Yahoo! BOSS Image, YouTube video search, and Twitter search API's, and are listed in FIG. 8. In other example embodiments, as discussed above with reference to the Facet-Specific Enhancer 606 above, added queries may comprise named entities that are substituted or added as proxies for designated facets, determined using local semantic index searches instead of hand-curation.

In block 1010, the KBSES then invokes the Category-Specific Enhancer 607 to add queries to the query strategy, where each added query consists of the entity name (from block 1001), and designation of the content category to which results are to be limited, as described with reference to the Category-Specific Enhancer 607 above.

In block 1011, the KBSES then invokes the Source Selection Enhancer 608 to add queries to the query strategy, where each added query consists of the entity name (from block 1001), and set of content sources to be included or excluded from the search, as described with reference to the Source Selection Enhancer 608 above. The KBSES logic then continues processing in block 1012

In block 1007, when it was determined that a facet-specific enhancement was not sufficient, the KBSES invokes an Entity-Specific Enhancer 602 to add queries to the query strategy, where each added query consists of the entity name (from block 1001), and terms or names of entities that appear in the designated entity's entry in the Entity Database 302, as specified in the description of the Entity-Specific Enhancer 602 above. The entity facets and the corresponding parts of the Entity Database 302 entry that are used by the Entity-Specific Enhancer 602 have been hand-picked, selected for their ability to retrieve relevant results from the Yahoo! BOSS Image, YouTube video search, and Twitter search API's, and are listed in FIG. 7.

In block 1008, the KBSES invokes the Related Entity Enhancer 605 to add queries to the query strategy, where each added query consists of the entity name (from block 1001), and the name of an entity such that the two entities co-occur frequently in a corpus of news and web pages, as specified in the description of the Related Entity Enhancer 605 above. The logic of the KBSES then continues in block 1012.

In block 1012, the KBSES determines whether use of an unenhanced fallback query is allowed, as indicated by the Enhancement Level Setter. If so, then in block 1013, the KBSES logic then adds a query to the query strategy consisting of the entity name. The KBSES then finishes its processing of the query strategy to return it to be used by the Result Retriever.

Note that in other embodiments, entity-specific enhancements may be processed first (regardless of whether facet-specific enhancements were indicated as sufficient) in order to place entity-specific queries into the query strategy. For example, blocks 1007 and 1008 may be processed before the test in block 1006 and the Entity-Specific Enhancer 602 invoked to add entity-specific enhanced queries into the query strategy. In this case, any facet-specific enhancements determined by the Facet-Specific Enhancer 606 are added to the query strategy, but typically only processed by the Result Retriever if and when the results returned are insufficient in amount. In such a scenario, facet-specific enhancements would not added when the Enhancement Level Setter determines that they would not be helpful (e.g., blocks 402, 404, 406, and 408 of FIG. 4). Other arrangements are possible.

Figure 11:
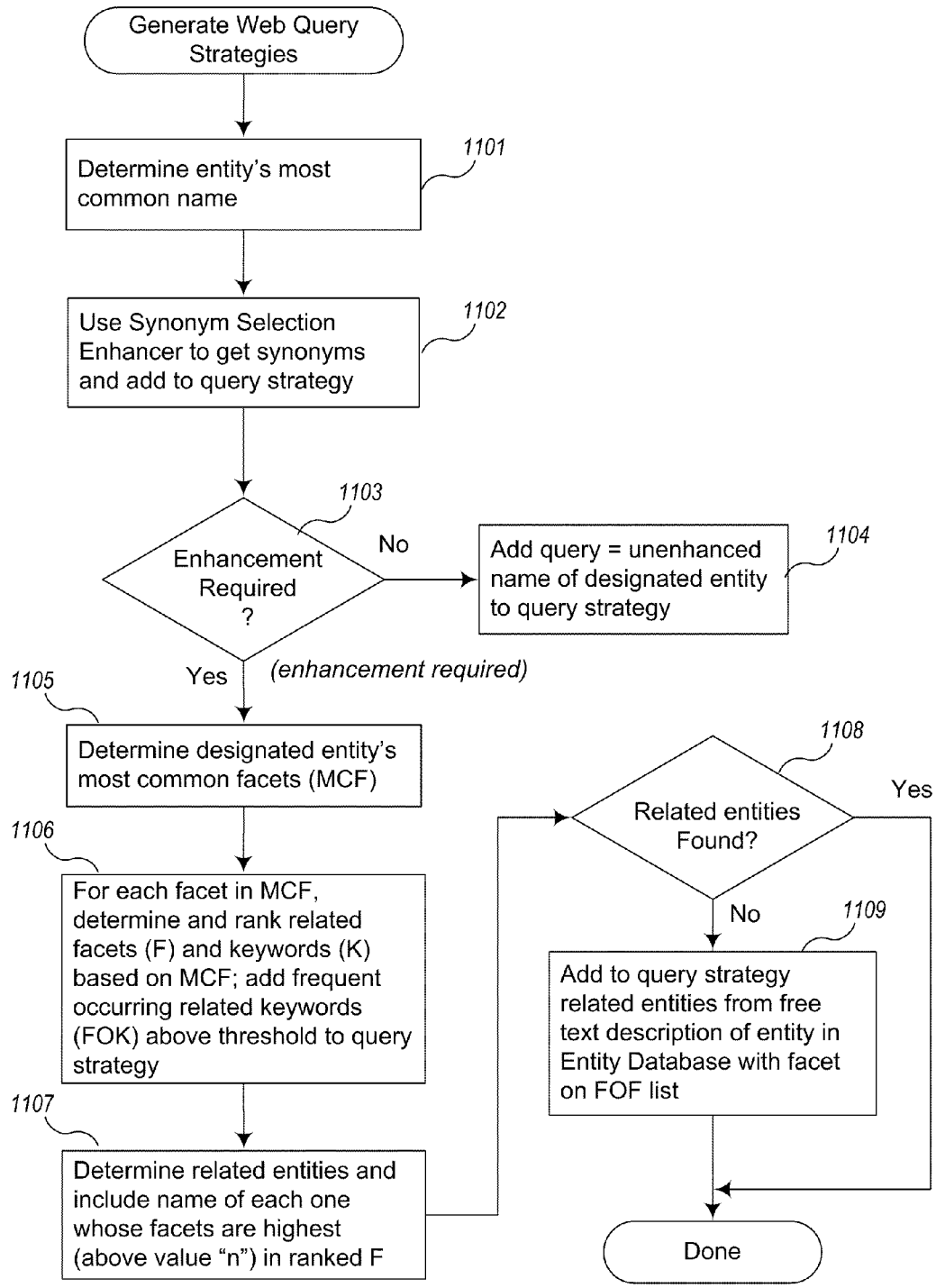
FIG. 11 is an example flow diagram of logic used by an example KBSES enhancers to generate query strategies for Yahoo! BOSS Web Search API.

FIG. 11 is an example flow diagram of logic used by an example KBSES enhancers to generate query strategies for Yahoo! BOSS Web Search API. In block 1101, the (enhancer logic of the) KBSES determines the entity name. The name of the entity can be the name obtained from the Entity Database 302. Alternatively, if there is a most-common-form name for the entity in the Most Common Form Name Database 306, then the KBSES may use that name.

In block 1102, the KBSES invokes the Synonym Selection Enhancer 603 to determine whether a set of useful synonyms should be added to the query strategy. In one embodiment, this process is performed by retrieving a list of suggested queries from a 3$^{rd}$ party query suggestion service, comparing this list to a list of aliases stored in the Entity Database 302 for the designated entity, and adding a query to the query strategy that reflects the names present on both lists (the intersection of the lists).

In block 1103, the KBSES determines whether an enhancement at all is needed, based upon the determination of an Enhancement Level Setter. If not, then in block 1104, the KBSES adds the unenhanced name of the designated entity as a query to the query strategy. If any kind of enhancement is indicated based upon the determination of the Enhancement Level Setter, then the KBSES continues in block 1105.

In block 1105, the KBSES determines the designated entity's most common facet, by looking up the entity in a Most Common Facet Database (not shown), which is created by compiling the frequency of occurrence of the entity in the context of one of one or more of its facets in a corpus. In this corpus, each entity occurrence is assigned one or more of the entity's facets (as listed in the Entity Database 302), based on the context in which the entity occurs. For instance, appearing in text describing his legal career, an occurrence of "Barack Obama" would be assigned the facet "Lawyer," whereas appearing in text describing his presidential actions, an occurrence of "Barack Obama" would be assigned the facets "Politician" and "Country Leader".

In block 1106, the KBSES invokes the Facet-Specific Enhancer 606 to determine a list of related, most commonly occurring, facets and keywords, given the entity's most common facet and to add queries to the query strategy, where each added query consists of the entity name (from block 1101), and the name of one of the determined keywords. In one embodiment, a list of facet-keyword and facet-facet associations is mined as a separate procedure from an index of news articles and text documents by the following process: 1) retrieving a list of entities that are tagged with a particular facet, using the Evri Query Language (EQL). For example, for the facet "Album," the EQL query is [Album] $<>*<>*$. The search result is a list of subject-action-object triples. 2) Review the list of triples, and count the frequency of occurrence of either a term or a facet. 3) Rank the facets and terms by their frequency of occurrence count, and apply a threshold value to select the most common ones.

In block 1107, the KBSES invokes the Related Entity Enhancer 605 to determine a set of entities related to the designated entity that also share a frequently occurring facet. The Related Entity Enhancer 605 then adds queries to the query strategy, where each added query consists of the entity name (from block 1101), and the name of a related entity such that the two entities co-occur frequently in a corpus of news and web pages, as specified in the description of the Related Entity Enhancer 605 above, and the related entity has a facet that is on the list of related facets, as determined in block 1106. One of the reasons it may be useful to select related entities by preferred (or frequently occurring) facets is because an entity might have a large number of related entities (e.g., for a musician, the places she was born or has lived, the schools she went to, etc.). To identify a musician, the related entities that will produce the most on-topic results are usually her bands, albums, or other musician's bands.

In block 1108, the KBSES determines whether any related entities were found in the prior block, and if not, invokes the Entity-Specific Enhancer 402 to add queries to the query strategy, where each added query consists of the entity name (from block 1101), and the name of a related entity. In this embodiment, the related entity is extracted from a free-text description in an entry in the Entity Database 302 corresponding to the designated entity, where the related entity has a facet that is on the list of related facets determined in block 1106. The KBSES then finishes its processing of the query strategy to return it to be used by the Result Retriever.

As described earlier with respect to the Facet-Specific Enhancer 606 of FIG. 6, in some embodiments, the initial user query itself involves a facet in addition to or instead of a named entity. In such cases, as explained above, it may be difficult to obtain on-topic results from a third party keyword-based search engine which will literally look only for occurrences of the named facet in the content to be searched. Thus, instead of enhancing a query that specifies a named entity with keywords due to its (inherent) facets, the system may use enhancers to substitute or expand named entities for facets. In one embodiment, the Facet-Specific Enhancer derives the named entities by performing "mini-searches" on relationship/semantic indexes to determine the most likely named entities for those facets. Then, some number of these most likely named entities are substituted (or added in some cases) to the query to obtain more on-topic results. Other combinations are possible as well.

Figure 12:
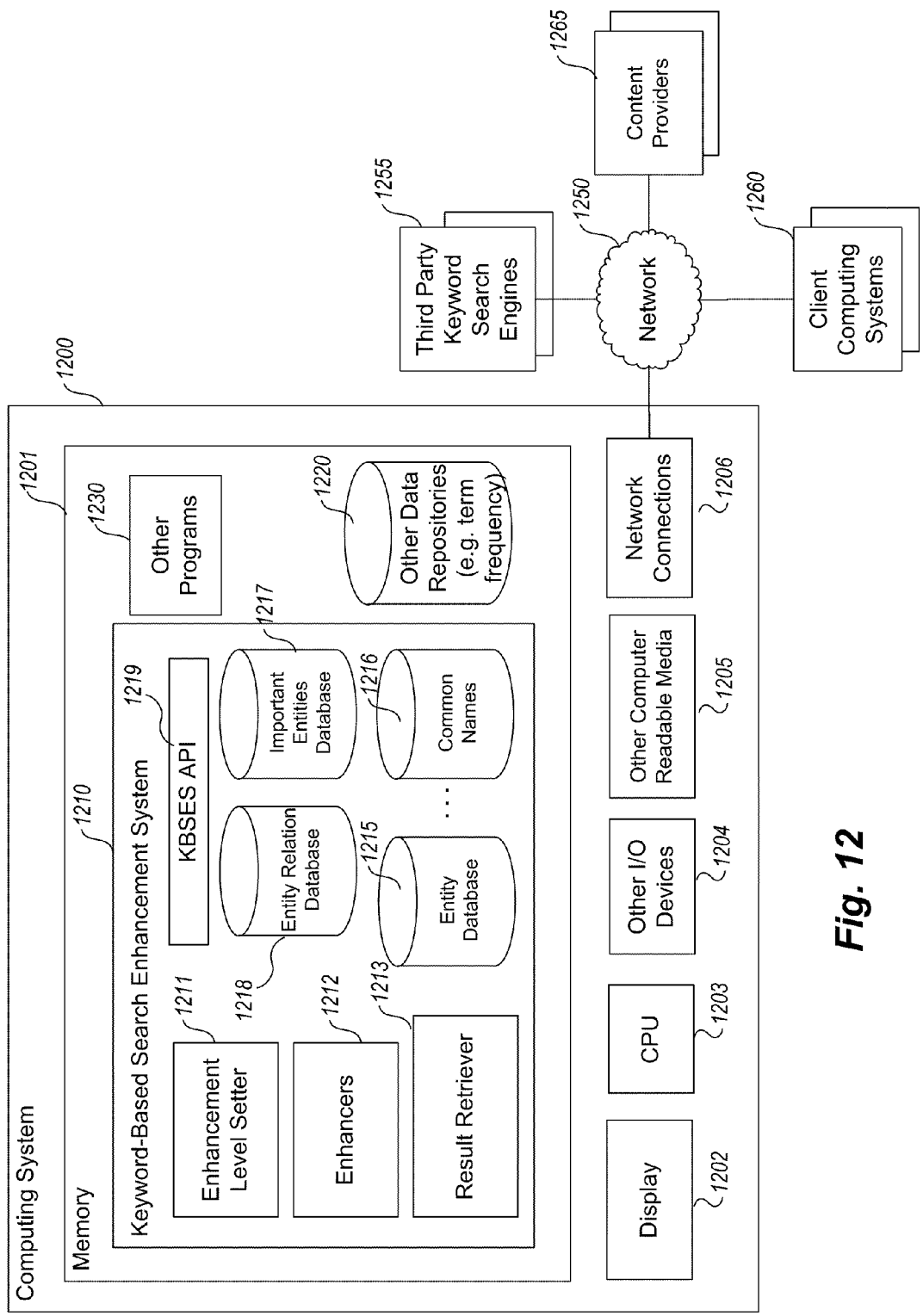
FIG. 12 is an example block diagram of a computing system for practicing embodiments of a Keyword-Based Search Enhancement System.

FIG. 12 is an example block diagram of an example computing system that may be used to practice embodiments of a Keyword-Based Search Enhancement System described herein. Note that a general purpose or a special purpose computing system suitably instructed may be used to implement an KBSES. Further, the KBSES may be implemented in software, hardware, firmware, or in some combination to achieve the capabilities described herein.

The computing system 1200 may comprise one or more server and/or client computing systems and may span distributed locations. In addition, each block shown may represent one or more such blocks as appropriate to a specific embodiment or may be combined with other blocks. Moreover, the various blocks of the Keyword-Based Search Enhancement System 1210 may physically reside on one or more machines, which use standard (e.g., TCP/IP) or proprietary interprocess communication mechanisms to communicate with each other.

In the embodiment shown, computer system 1200 comprises a computer memory ("memory") 1201, a display 1202, one or more Central Processing Units ("CPU") 1203, Input/Output devices 1204 (e.g., keyboard, mouse, CRT or LCD display, etc.), other computer-readable media 1205, and one or more network connections 1206. The KBSES 1210 is shown residing in memory 1201. In other embodiments, some portion of the contents, some of, or all of the components of the KBSES 1210 may be stored on and/or transmitted over the other computer-readable media 1205. The components of the Keyword-Based Search Enhancement System 1210 preferably execute on one or more CPUs 1203 and manage the generation of query strategies and use of query enhancers, as described herein. Other code or programs 1230 and potentially other data repositories, such as data repository 1220, also reside in the memory 1201, and preferably execute on one or more CPUs 1203. Of note, one or more of the components in FIG. 12 may not be present in any specific implementation. For example, some embodiments embedded in other software may not provide means for user input or display.

In a typical embodiment, the KBSES 1210 includes one or more enhancement level setters 1211, one or more query enhancers 1212, a result retriever, and one or more databases 1215-1218. In at least some embodiments, the one or more of the databases are provided external to the KBSES and are available, potentially, over one or more networks 1250. In addition, in at least some embodiments the techniques for enhancing queries and developing a query strategy for $3^{rd}$ party keyword-based search API are available to other programs via KBSES API 1219. Other and/or different modules may be implemented. In addition, the KBSES may interact via a network 1250 with third party keyword-search engines 1255 as described herein, one or more client computing systems 1260, and/or one or more content provider systems 1265, such as purveyors of the news articles used to construct important entities data repository 1217. Also, of note, the entity database data repository 1215 may be provided external to the KBSES as well, for example in storage accessible over one or more networks 1250.

In an example embodiment, components/modules of the KBSES 1210 are implemented using standard programming techniques. However, a range of programming languages known in the art may be employed for implementing such example embodiments, including representative implementations of various programming language paradigms, including but not limited to, object-oriented (e.g., Java, C++, C#, Smalltalk, etc.), functional (e.g., ML, Lisp, Scheme, etc.), procedural (e.g., C, Pascal, Ada, Modula, etc.), scripting (e.g., Perl, Ruby, Python, JavaScript, VBScript, etc.), declarative (e.g., SQL, Prolog, etc.), etc.

The embodiments described above may also use well-known or proprietary synchronous or asynchronous client-server computing techniques. However, the various components may be implemented using more monolithic programming techniques as well, for example, as an executable running on a single CPU computer system, or alternately decomposed using a variety of structuring techniques known in the art, including but not limited to, multiprogramming, multithreading, client-server, or peer-to-peer, running on one or more computer systems each having one or more CPUs. Some embodiments are illustrated as executing concurrently and asynchronously and communicating using message passing techniques. Equivalent synchronous embodiments are also supported by an KBSES implementation.

In addition, programming interfaces to the data stored as part of the KBSES 1210 (e.g., in the data repositories 1216 and 1217) can be available by standard means such as through C, C++, C#, and Java APIs; libraries for accessing files, databases, or other data repositories; through scripting languages such as XML; or through Web servers, FTP servers, or other types of servers providing access to stored data. The databases 1215-1218 may be implemented as one or more database systems, file systems, or any other method known in the art for storing such information, or any combination of the above, including implementation using distributed computing techniques.

Also the example KBSES 1210 may be implemented in a distributed environment comprising multiple, even heterogeneous, computer systems and networks. For example, in one embodiment, the enhancement level setter 1211, the enhancers 1212, and the result retriever 1213 are all located in physically different computer systems. In another embodiment, various modules of the KBSES 1210 are hosted each on a separate server machine and may be remotely located from the tables which are stored in the data repositories 1215-1218. Also, one or more of the modules may themselves be distributed, pooled or otherwise grouped, such as for load balancing, reliability or security reasons. Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) etc. Other variations are possible. Also, other functionality could be provided by each component/module, or existing functionality could be distributed amongst the components/modules in different ways, yet still achieve the functions of an KBSES.

Furthermore, in some embodiments, some or all of the components of the KBSES may be implemented or provided in other manners, such as at least partially in firmware and/or hardware, including, but not limited to one ore more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the system components and/or data structures may also be stored (e.g., as executable or other machine readable software instructions or structured data) on a computer-readable medium (e.g., a hard disk; a memory; a network; or a portable media article to be read by an appropriate drive or via an appropriate connection). Some or all of the system components and data structures may also be may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

From the foregoing it will be appreciated that, although specific embodiments have been described herein for purposes of illustration, various modifications may be made without deviating from the spirit and scope of the present disclosure. For example, the methods, systems, and techniques for performing enhanced queries using keyword-based search tool API discussed herein are applicable to other architectures. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A method in a computing system for improving the relevance of search results retrieved from one or more keyword-based search engines, comprising:
   receiving an indication of a designated entity having a name;
   determining whether the name of the designated entity is likely to lead to relevancy errors when used in a keyword-based search by performing a test to determine if the name of the designated entity matches a word that is not an entity, the name of the designated entity is a substring of a different entity's name, the name of the designated entity matches a name of a different entity having a facet that is not shared by the designated entity, or the name of the designated entity matches a name of a different entity with a facet that is shared with the designated entity;
   when determined that the name of the designated entity is likely to lead to relevancy errors, determining whether the name of the designated entity should be enhanced with an entity-specific enhancement, a facet-specific enhancement, or both types of enhancements, to formulate an enhanced query strategy, wherein the enhanced query strategy comprises a plurality of automatically generated queries that include disambiguation information, wherein an entity-specific enhancement includes a name of an entity, action, or property value related to the designated entity or related through a facet of the designated entity, and wherein a facet-specific enhancement includes one or more terms related to a facet; and
   when determined that the name of the designated entity is to be enhanced to formulate the enhanced query strategy, using one or more query enhancer components of the computing system selected based upon the determination of whether the name of the designated entity is to be enhanced with the entity-specific enhancement and/or the facet-specific enhancement, automatically adding one or more entity-specific queries and/or one or more facet-specific queries to the name of the designated entity to generate the enhanced query strategy, wherein at least one of the enhancements is based upon one or more facets associated with the designated entity; and
   forwarding the automatically generated query strategy to the one or more keyword-based search engines to generate on-topic information related to the designated entity.

2. The method of claim 1 wherein each query in the generated query strategy is reformulated by a result retriever to comply with an interface of the keyword-based search engine API.

3. The method of claim 1 wherein the one or more entity-specific queries generate an enhanced query as part of the query strategy with the name of the designated entity and a name of a related entity.

4. The method of claim 3 wherein the enhanced query is generated when the related entity shares a facet with the designated entity.

5. The method of claim 1 wherein the one or more entity-specific queries generate an enhanced query as part of the query strategy with a value of a property that relates to a facet of the designated entity.

6. The method of claim 5 wherein the value of the property that relates to the facet of the designated entity is text or a name of an indicated entity.

7. The method of claim 1 wherein the one or more facet-specific queries generate an enhanced query as part of the query strategy with a name of the designated entity and a keyword identified as related to a facet of the designated entity.

8. The method of claim 7 wherein the keyword is an entity name used as an approximation of one or more facets.

9. The method of claim 1, further comprising:
   using a category enhancer of the computing system to automatically add a category name as a category limit the generated query strategy, the category name associated with a facet of the designated entity; and
   wherein the forwarding the automatically generated query strategy to the keyword-based search engine, generates a query using an API specifying the category name as a category limit to retrieved information related to the designated entity.

10. The method of claim 1, further comprising:
    using a source selection enhancer of the computing system to automatically add to the generated query strategy a named source of content to be included or excluded; and
    wherein the forwarding the automatically generated query strategy to the keyword-based search engine, generates a query using an API specifying to include or exclude a named source of content when retrieving information related to the designated entity.

11. The method of claim 1, further comprising:
    using a result retriever to formulate and forward the enhanced queries in the automatically generated query strategy to the keyword-based search engine, wherein the enhanced queries are forwarded successively until sufficient on-topic information related to the designated entity is retrieved.

12. The method of claim 1 wherein the automatically generated query strategy is used with a keyword-based search engine API for searching images.

13. The method of claim 1 wherein the automatically generated query strategy is used with a keyword-based search engine API for web searching.

14. The method of claim 1 wherein the automatically generated query strategy is used with a keyword-based search engine API for searching videos.

15. The method of claim 1 wherein the automatically generated query strategy is used with a keyword-based search engine API for searching social network related messages.

16. The method of claim 1 wherein the automatically generated query strategy with enhance queries is performed on behalf of a user.

17. The method of claim 1 wherein the entity is at least one of a person, organization, location, concept, event, product, condition, organism, or substance.

18. The method of claim 1 wherein the one or more facets are associated with an ontology used to classify entity types.

19. A computing system comprising:
a memory;
a processor;
an enhancement level setter module stored in the memory and configured, when executed by the processor, to:
determine whether a name of a designated entity is likely to lead to relevancy errors when used in a search by performing a test to determine if the name of the designated entity matches a word that is not an entity, the name of the designated entity is a substring of a different entity's name, the name of the designated entity matches a name of a different entity having a facet that is not shared by the designated entity, or the name of the designated entity matches a name of a different entity with a facet that is shared with the designated entity; and
when determined that the name of the designated entity is likely to lead to relevancy errors, determine an enhancement level for an initial query designated to be run against a keyword-based search engine API by performing a test to determine if a name of a designated entity matches a word that is not an entity, the name of the designated entity is a substring of a different entity's name, the name of the designated entity matches a name of a different entity having a facet that is not shared by the designated entity, or the name of the designated entity matches a name of a different entity with a facet that is shared with the designated entity;
one or more enhancer modules stored in the memory and configured, when executed by the processor, to receive the determined enhancement level from the enhancement level setter module and produce a query strategy containing one or more subqueries that enhance the initial query using one or more of an entity-specific enhancement and/or a facet-specific enhancement to reduce ambiguity such that more on-topic results will be more likely to be produced; and
a result retriever module stored in the memory and configured, when executed by the processor, to:
receive the query strategy from the one or more enhancer modules and formulate enhanced subqueries in the syntax of the keyword-based search engine API;
run the formulated enhanced subqueries using the keyword-based search engine API until sufficient results are obtained; and
return the results.

20. The system of claim 19 wherein the one or more enhancer modules include at least one of an entity-level enhancer, a facet-level enhancer, a category enhancer, an entity database enhancer, a source selection enhancer, and/or a related entity enhancer.

21. The system of claim 19 wherein each subquery the query strategy comprises one or more of root terms, enhancing keywords or phrases, content categories, and/or source limitations.

22. The system of claim 19 wherein the keyword-based search engine API is an API for searching one or more of text, images, music, sound, video, objects, web pages.

23. The system of claim 19 further comprising instructions stored in the memory of the computing system that are executed by the processor to effectuate the actions of the enhancement level setter module, the one or more enhancer modules, and the result retriever module.

24. A non-transitory computer-readable memory medium containing content to control a computing system to perform a method comprising:
receiving an indication of a designated entity having a name;
determining whether the name of the designated entity is likely to lead to relevancy errors when used in a keyword-based search by performing a test to determine if the name of the designated entity matches a word that is not an entity, the name of the designated entity is a substring of a different entity's name, the name of the designated entity matches a name of a different entity having a facet that is not shared by the designated entity, or the name of the designated entity matches a name of a different entity with a facet that is shared with the designated entity;
when determined that the name of the designated entity is likely to lead to relevancy errors, determining whether and how the name of the designated entity should be enhanced with an entity-specific enhancement, facet-specific enhancement, category enhancement, and/or source selection enhancement; and
when determined that the name of the designated entity is to be enhanced,
using one or more query enhancers of the computing system selected based upon the determination of how the name of the designated entity is to be enhanced, automatically adding one or more entity-specific queries, one or more facet-specific queries, one or more category restrictions and/or one or more source selections to the name of the designated entity used as a keyword, to generate an enhanced query strategy containing a plurality of sub-queries, wherein at least one of the enhancements is based upon one or more facets associated with the designated entity;
ordering the plurality of sub-queries into an order based upon likelihood of returning best on-topic information; and
forwarding the automatically generated query strategy to the keyword-based search engine to execute the plurality of sub-queries in the order until sufficient on-topic information related to the designated entity is generated.

25. A non-transitory computer-readable storage medium configured to contain content for controlling a computing system to perform a method comprising:
receiving an indication of a designated entity having a name;

determining whether the name of the designated entity is likely to lead to relevancy errors when used in a keyword-based search by performing a test to determine if the name of the designated entity matches a word that is not an entity, the name of the designated entity is a substring of a different entity's name, the name of the designated entity matches a name of a different entity having a facet that is not shared by the designated entity, or the name of the designated entity matches a name of a different entity with a facet that is shared with the designated entity;

when determined that the name of the designated entity is likely to lead to relevancy errors, determining whether the name of the designated entity should be enhanced with an entity-specific enhancement, a facet-specific enhancement, or both types of enhancements, to formulate an enhanced query strategy, wherein the enhanced query strategy comprises a plurality of automatically generated queries that include disambiguation information, wherein an entity-specific enhancement includes a name of an entity, action, or property value related to the designated entity or related through a facet of the designated entity and wherein a facet-specific enhancement includes one or more terms related to a facet; and when determined that the name of the designated entity is to be enhanced to formulate the enhanced query strategy, using one or more query enhancer modules of the computing system, selected based upon the determination of whether the designated entity is to be enhanced with the entity-specific enhancement and/or the facet-specific enhancement, automatically adding one or more entity-specific queries and/or one or more facet-specific queries to the name of the designated entity to generate the enhanced query strategy, wherein at least one of the enhancements is based upon one or more facets associated with the designated entity; and forwarding the automatically generated query strategy to one or more keyword-based search engines to generate on-topic information related to the designated entity.

26. The computer-readable storage medium of claim 25 wherein the storage medium is a memory of the computing system and the content are instructions that control a computer process to perform the method.

* * * * *